(12) United States Patent
Licht

(10) Patent No.: US 9,758,881 B2
(45) Date of Patent: Sep. 12, 2017

(54) PROCESS FOR ELECTROSYNTHESIS OF ENERGETIC MOLECULES

(75) Inventor: Stuart Licht, Leesburg, VA (US)

(73) Assignee: The George Washington University, Washington, DC (US)

( * ) Notice: Subject to any disclaimer, the term of this patent is extended or adjusted under 35 U.S.C. 154(b) by 801 days.

(21) Appl. No.: 12/704,748

(22) Filed: Feb. 12, 2010

(65) Prior Publication Data

US 2010/0200418 A1 Aug. 12, 2010

Related U.S. Application Data

(60) Provisional application No. 61/152,215, filed on Feb. 12, 2009, provisional application No. 61/254,943, filed on Oct. 26, 2009.

(51) Int. Cl.
| | | |
|---|---|---|
| B01J 19/12 | (2006.01) | |
| C25B 1/00 | (2006.01) | |
| C25B 9/00 | (2006.01) | |

(52) U.S. Cl.
CPC .............. *C25B 1/00* (2013.01); *B01J 19/128* (2013.01); *C25B 9/00* (2013.01); *Y02P 20/134* (2015.11)

(58) Field of Classification Search
CPC .. C25B 1/00; C25B 9/00; Y02P 20/134; B01J 19/128
USPC ........................................................ 205/340
See application file for complete search history.

(56) References Cited

U.S. PATENT DOCUMENTS

| | | | |
|---|---|---|---|
| 2,916,534 A | 12/1959 | Schallus et al. | |
| 3,085,053 A * | 4/1963 | Taylor ........................ | 205/354 |
| 3,173,849 A | 3/1965 | Shearer et al. | |
| 3,236,691 A | 2/1966 | Reger et al. | |
| 3,265,606 A | 8/1966 | Marullo et al. | |
| 3,374,120 A | 3/1968 | Lawson | |
| 3,401,062 A | 9/1968 | Lyons, Jr. | |
| 3,419,435 A | 12/1968 | Recht et al. | |
| 3,463,709 A * | 8/1969 | Russell ........................ | 205/354 |
| 3,615,839 A * | 10/1971 | Thompson et al. .......... | 429/425 |
| 3,655,537 A * | 4/1972 | Russell et al. ............... | 205/354 |
| 3,661,753 A * | 5/1972 | Aylward et al. ............. | 205/354 |
| 3,919,390 A * | 11/1975 | Moore ........................ | 423/210.5 |
| 4,041,210 A * | 8/1977 | Van Dine ..................... | 429/415 |
| 4,090,012 A | 5/1978 | Elliott et al. | |
| 4,197,421 A * | 4/1980 | Steinberg ...................... | 205/555 |
| 4,420,381 A | 12/1983 | Silvilotti et al. | |

(Continued)

FOREIGN PATENT DOCUMENTS

| | | |
|---|---|---|
| EP | 111870 A2 * | 6/1984 |
| FR | 2919618 A1 | 2/2009 |

OTHER PUBLICATIONS

Machine translation of EP 111870 A2.*

(Continued)

*Primary Examiner* — Keith Hendricks
*Assistant Examiner* — Colleen M Raphael
(74) *Attorney, Agent, or Firm* — Blank Rome LLP

(57) ABSTRACT

A process for the production of energetically rich compounds comprising: using externally supplied thermal energy to heat an electrolyzable compound to a temperature greater than the ambient temperature; generating electricity from a solar electrical photovoltaic component; subjecting the heated electrolyzable compound to electrolysis with the solar generated electricity to generate an energetically rich electrolytic product.

36 Claims, 9 Drawing Sheets

(56) References Cited

U.S. PATENT DOCUMENTS

| | | | |
|---|---|---|---|
| 4,459,187 A | | 7/1984 | Lagana et al. |
| 4,478,699 A | * | 10/1984 | Halmann et al. ........ 204/157.87 |
| 4,529,488 A | | 7/1985 | Kotani et al. |
| 4,545,872 A | * | 10/1985 | Sammells et al. ............ 205/340 |
| 4,592,814 A | * | 6/1986 | Vaughan et al. .............. 205/555 |
| 4,608,132 A | * | 8/1986 | Sammells ...................... 205/440 |
| 4,609,451 A | * | 9/1986 | Sammells et al. ............ 205/340 |
| 4,673,473 A | * | 6/1987 | Ang et al. ..................... 205/441 |
| 4,756,806 A | * | 7/1988 | Krist et al. .................... 205/462 |
| 4,804,448 A | | 2/1989 | Sammells et al. |
| 4,841,731 A | * | 6/1989 | Tindell .......................... 205/340 |
| 4,897,167 A | * | 1/1990 | Cook et al. ................... 205/342 |
| 5,246,551 A | * | 9/1993 | Pletcher et al. .............. 205/510 |
| 5,578,140 A | | 11/1996 | Yogev et al. |
| 5,865,982 A | * | 2/1999 | Sawa et al. ................... 205/413 |
| 6,565,733 B1 | | 5/2003 | Sportel et al. |
| 6,692,861 B2 | | 2/2004 | Tao |
| 6,843,903 B2 | | 1/2005 | Roe et al. |
| 7,241,950 B2 | | 7/2007 | Fan et al. |
| 7,316,765 B2 | | 1/2008 | Tojo et al. |
| 7,459,065 B2 | | 12/2008 | Kelly et al. |
| 7,465,379 B2 | | 12/2008 | Siljan |
| 7,645,931 B2 | | 1/2010 | Gibson et al. |
| 7,704,369 B2 | * | 4/2010 | Olah et al. .................... 205/450 |
| 8,365,529 B2 | | 2/2013 | Litwin et al. |
| 2004/0060826 A1 | | 4/2004 | Godfrey |
| 2006/0019133 A1 | | 1/2006 | Cooper |
| 2007/0246368 A1 | | 10/2007 | Huber et al. |
| 2007/0269688 A1 | | 11/2007 | Lipilin et al. |
| 2008/0135403 A1 | * | 6/2008 | Jang et al. .................... 204/274 |
| 2008/0223727 A1 | * | 9/2008 | Oloman et al. ............... 205/413 |
| 2008/0245672 A1 | * | 10/2008 | Little et al. ................... 205/555 |
| 2008/0314593 A1 | | 12/2008 | Vinegar et al. |
| 2009/0016948 A1 | * | 1/2009 | Young ....................... C25B 1/00 423/414 |
| 2009/0057161 A1 | * | 3/2009 | Aulich ...................... C25B 3/00 205/436 |
| 2009/0200025 A1 | | 8/2009 | Bravo |
| 2009/0258278 A1 | | 10/2009 | Steinberg |
| 2010/0000874 A1 | * | 1/2010 | Hinman .................. C25B 1/003 205/340 |
| 2010/0018569 A1 | | 1/2010 | Mitchell et al. |
| 2010/0200421 A1 | | 8/2010 | Aujollet |
| 2011/0100832 A1 | | 5/2011 | Lubomirsky et al. |

OTHER PUBLICATIONS

Ishihara et al, "High-Temperature Electrochemical Heat Pump Using a Water Gas Shift Reaction. Electrochemical Reduction of $CO_2$ to CO," Bull. Chem. Soc. Jpn. vol. 74, pp. 1517-1523 (2001).*
Hamdy et al, "Model of a Spectrally Selective Decoupled Photovoltaic/Thermal Concentrating System," Applied Energy 30 (1988) pp. 209-225.*
deBethune, A.J., et al., "The Temperature Coefficients of Electrode Potentials," Journal of the Electrochemical Society, vol. 106, No. 7, Jul. 1959, pp. 616-625.
O'Regan, Brian, et al., "A Low-Cost, High-Efficiency Solar Cell based on Dye-Sensitized Colloidal $TiO_2$ Films," Nature, vol. 353, Oct. 24, 1991, pp. 737-739.

"Search for Species Data by Chemical Formula," Chemistry, 2008.
"Executive Summary," OECD/IEA, 2007, pp. 19-29.
"Global $CO_2$ Emissions: Increase Continued in 2007," Publications, 2008.
Pellegrino, J.L., "Energy and Environmental Profile of the U.S. Chemical Industry," U.S. Department of Energy Office of Industrial Technologies, May 2000.
Ganley, Jason, C., "High Temperature and Pressure Alkaline Electrolysis," International Journal of Hydrogen Energy, vol. 34, 2009, pp. 3604-3611.
Marina, O.A., et al., "Electrode Performance in Reversible Solid Oxide Fuel Cells," Journal of the Electrochemical Society, vol. 154, No. 5, 2007, pp. B452-B459.
International Search Report; International Application No. PCT/US11/24576; International Filing Date: Feb. 11, 2011; Date of Mailing: Apr. 25, 2011; 7 Pages.
Written Opinion of the International Searching Authority; International Application No. PCT/US11/24576; International Filing Date: Feb. 11, 2011; Date of mailing: Apr. 25, 2011; 5 Pages.
Licht, S., et al., "Efficient Solar Water Splitting, Exemplified by $RuO_2$-Catalyzed AlGaAs/Si Photoelectrolysis," J. Phys. Chem. B, vol. 104, No. 38, Jul. 27, 2000, pp. 8920-8924.
Licht, S., et al., "Light Invariant, Efficient, Multiple Band Gap AlGaAs/Si/metal Hydride Solar Cell," Applied Physics Letters, vol. 74, No. 26, Jun. 28, 1999, pp. 4055-4057.
Licht, Stuart, "Multiple Band Gap Semiconductor/Electrolyte Solar Energy Conversion," J. Phys. Chem. B, vol. 105, No. 27, Feb. 12, 2001, pp. 6281-6294.
Licht, Stuart, "Optimizing Photoelectrochemical Solar Energy Conversion: Multiple Bandgap and Solution Phase Phenomena," Semiconductor Electrodes & Photoelectrochemistry, vol. 6, Encycl. Electrochemistry, 2002, pp. 358.
Licht, Stuart, "A Description of Energy Conversion in Photoelectrochemical Solar Cells," Nature International Weekly Journal of Science, vol. 330, No. 6144, Nov. 1987, pp. 148-151.
Licht, Stuart, "Efficient Solar Generation of Hydrogen Fuel—A Fundamental Analysis," Electrochemistry Communications, vol. 4, Aug. 14, 2002, pp. 790-795.
Licht, Stuart, "Solar Water Splitting to Generate Hydrogen Fuel: Photothermal Electrochemical Analysis," J. Phys. Chem. B., vol. 107, Feb. 6, 2003, pp. 4253-4260.
Licht, Stuart, "Thermochemical Solar Hydrogen Generation," ChemComm, Jun. 16, 2005, pp. 4635-4646.
Licht, Stuart, et al., "Electrochemical Potential Tuned Solar Water Splitting," ChemComm, J. Phys. Chem. B., vol. 107 No. 18, Aug. 7, 2003, pp. 3006-4260.
Licht, Stuart, et al., "Efficient Photoelectrochemical Solar Cells from Electrolyte Modification," Nature International Weekly Journal of Science, vol. 345, No. 6273, May 24, 1990, pp. 330-333.
Licht, Stuart, et al., "A Light-Variation Insensitive High Efficiency Solar Cell," Nature International Weekly Journal of Science, vol. 326, No. 6116, May 6, 1987, pp. 862-864.
Light, Truman S., et al., "The Fundamental Conductivity and Resistivity of Water," Electrochemical and Solid-State Letters, vol. 8, 2005, pp. E16-E19.
Zou, Zhigang, et al., "Direct Splitting of Water under Visible Light Irradiation with an Oxide Semiconductor Photocatalyst," Nature, vol. 414, No. 6, Dec. 2001, pp. 625-628.

* cited by examiner

PROCESS FOR ELECTROSYNTHESIS OF ENERGETIC MOLECULES

CROSS REFERENCE TO RELATED APPLICATIONS

This application claims the benefit of U.S. Provisional Patent Application Nos. 61/152,215 filed on Feb. 12, 2009 and 61/254,943 filed on Oct. 26, 2009 both of which are incorporated by reference herein in their entirety.

BACKGROUND

This technology relates to a method and system of using solar energy to drive the thermally activated electrosynthesis of energetic molecules.

One third of the global industrial sector's annual emission of $1\times10^{10}$ metric tons of the greenhouse gas, $CO_2$, is released in the production of metals and chlorine. This, together with the additional $CO_2$ emissions for electrical generation, heating and transportation, comprise the majority of anthropogenic $CO_2$ emissions.

Photoelectrochemical solar cells (PECs) can convert solar energy to electricity and with inclusion of an electrochemical storage couple, have the capability for internal energy storage, to provide a level output despite variations in sunlight. Solar energy can also be stored externally in chemical form, when it is used to drive the formation of energetically rich chemicals. As an example in 2001, external multiple bandgap PVs (photovoltaics) were used to generate $H_2$ by splitting water at 18% solar energy conversion efficiency. In 2002, a hybrid photo-thermal electrochemical theory was introduced, and verified by experiment in 2003, for $H_2$ generation at over 30% solar energy conversion efficiency.

Light driven water splitting was originally demonstrated with $TiO_2$ (a semiconductor with a bandgap, $E_g$, >3.0 eV). However, only a small fraction of sunlight has sufficient energy to drive $TiO_2$ photoexcitation, and studies had sought to tune (lower) the semiconductor bandgap to provide a better match to the electrolysis potential. An alternative approach is to tune (lower) the electrolysis potential, as was demonstrated with Si ($E_g$=1.1 eV) solar driven, high temperature water electrolysis. With increasing temperature, the quantitative decrease in the electrochemical potential to split water to hydrogen and oxygen had been well known by the 1950's, and as early as 1980 it was noted that solar thermal energy could decrease the necessary energy for the generation of $H_2$ by electrolysis. However, the process combines elements of solid state physics, insolation and electrochemical theory, complicating rigorous theoretical support of the process. The first hybrid photo-thermal electrochemical theory for the solar generation of $H_2$ was developed in 2002. The thermal/electrochemical hybrid model for solar/$H_2$ by this process, was the first derivation of bandgap restricted, thermal enhanced, solar water splitting efficiencies. The model was initially derived for AM1.5 (terrestrial insolation), and later expanded to include sunlight above the atmosphere (AM0 insolation). The experimental accomplishment of 30% solar $H_2$ conversion efficiency followed, establishing that the water splitting potential can be specifically tuned to match efficient photo-absorbers, eliminating the challenge of tuning (varying) the semiconductor bandgap, and can lead to over 30-50% solar energy conversion to $H_2$ efficiencies. That process was specific to $H_2$ and does not contemplate the production of other energetically rich chemicals.

BRIEF DESCRIPTION OF THE INVENTION

Disclosed herein is a process for the solar generation of energetically rich chemicals, other than hydrogen. This process captures sunlight more efficiently than photovoltaics alone. The process comprises using externally supplied thermal energy to heat an electrolyzable compound to a temperature greater than the ambient temperature, generating electricity from a solar electrical photovoltaic component, subjecting the heated electrolyzable compound to electrolysis with the solar generated electricity to generate an electrolytic product. This process is frequently referred to herein as the STEP (Solar Thermal Electrochemical Photo) process or STEP driven process.

For example, the STEP driven energy conversion process (i.e., the generation of energetic molecule formation process) can convert anthropogenic $CO_2$ generated in burning fossil fuels, and eliminate $CO_2$ emissions associated with the generation of metals, chlorine and energetic compounds related to chlorine such as bleach, while efficiently using solar energy to form these needed materials.

The externally supplied thermal energy source may be derived from a variety of sources. The carbon dioxide can be converted to carbon as well as carbon monoxide. For example, the externally supplied thermal energy can be derived from solar energy (including magnified solar energy), exhaust gasses, heat from combustion or industrial processes, nuclear energy, and geothermal energy. The externally supplied energy can generate high temperatures (above 200° C.) which lowers the amount of energy needed (decreases reaction energy) to perform electrolytic generation of energy rich products. Once formed, energy rich products can be used in many ways. For example, the high temperature can also be used to "split" $CO_2$ since the reaction energy is lowered at high temperatures. Potential products of $CO_2$ splitting include carbon and carbon monoxide. Carbon monoxide is a significant industrial gas with a myriad of uses, including the bulk manufacturing of acetic acid and aldehydes (and detergent precursors), and for use in industrial nickel purification. To alleviate challenges of fossil-fuel resource depletion CO is an important syngas component and a reactant to form a wide variety of fuels, which can be formed through the reaction of carbon monoxide with $H_2$. Furthermore, the ability to remove $CO_2$ from exhaust stacks or atmospheric sources provides a constructive response to linked environmental impacts, including global warming due to anthropogenic $CO_2$ emission.

Disclosed herein is an apparatus for lowering the electrochemical potential for electrolysis of one or more electrolyzable compounds in an electrolysis system, comprising: a heat exchanger for capturing heat from a solar electrical photovoltaic component of a solar electrolysis system; and an electrolysis chamber for combining a solar thermal heating component with the captured heat from the solar electrical photovoltaic component to lower the electrochemical potential for electrolysis of one or more electrolyzable compounds.

The apparatus having the heat exchanger may further comprise a pre-heater for pre-heating the electrolyzable compounds.

The heat exchanger may capture heat from the electrolysis reaction and said captured electrolysis heat is combined with heat captured from the solar electrical photovoltaic component.

Disclosed herein is also a process for lowering the electrochemical potential for electrolysis of one or more electrolyzable compounds, comprising: capturing heat from a solar electrical photovoltaic component of a solar electrolysis system; adding the captured heat to an externally supplied thermal energy source; heating the one or more electrolyzable compounds using the combined thermal energy of the captured heat and the externally supplied thermal energy source to a desired temperature including where the electrolyzable compounds are heated above ambient temperature, or to a temperature of 200 to 650 degrees Celsius, or to a temperature of 650 to 1500 degrees Celsius.

The process may be a cyclic electrolysis process, and comprise the additional step of capturing heat from the electrolysis process to pre-heat electrolyzable compounds in the cyclic process.

Also disclosed herein is a process for generation of electrolysis products using recovered heat as a secondary heat source, comprising: splitting captured solar spectrum energy into a solar thermal heating component and a solar electrical photovoltaic component; generating electricity from the solar electrical photovoltaic component; capturing heat from the solar electrical photovoltaic component; combining the solar thermal heating component with the captured heat from the solar electrical photovoltaic component; heating one or more electrolyzable compounds to a temperature above ambient temperature, or to a temperature of 200 to 650 degrees Celsius, or to a temperature of 650 to 1500 degrees Celsius; subjecting said heated electrolyzable compounds to electrolysis; and obtaining electrolysis products other than $H_2$.

The process may be a cyclical process and the heat from the solar electrical photovoltaic component is used to pre-heat electrolyzable compounds prior to subjecting the electrolyzable compounds to heating by the solar thermal heating component.

The process may further comprise the step of capturing heat from the electrolysis process to pre-heat electrolyzable compounds in a cyclic process.

Also disclosed is an apparatus for generation of electrolysis products using recovered heat as a secondary heat source, comprising: a beam splitter for splitting captured solar spectrum energy into a solar thermal heating component and a solar electrical photovoltaic component; a photovoltaic cell for generating electricity from the solar electrical photovoltaic component; an optional heat exchanger for delivering heat from the products of the electrolysis to heat the incoming reactants; a heat exchanger for capturing heat from the solar electrical photovoltaic component; an electrolysis chamber for combining the solar thermal heating component with the captured heat from the solar electrical photovoltaic component and heating one or more electrolyzable compounds to a temperature above ambient temperature, or to a temperature of 200 to about 650 degrees Celsius, or to a temperature of 650 to about 1500 degrees Celsius; and a collection chamber for collecting the electrolysis products from the electrolysis of the heated electrolyzable compounds.

The electrolyzable compounds can be selected from a group consisting of water, $CO_2$, metal salts, and carbonate, oxide and chloride salts.

BRIEF DESCRIPTION OF THE DRAWINGS

FIG. 10 bottom shows the electrolysis current stability.

DETAILED DESCRIPTION

Whereas a single small band gap material, such as silicon, cannot generate the minimum potential required to drive many room temperature redox couples, a bipolar (series) arrangements of photovoltaics can generate a larger potential. This is shown in the left and middle portions of FIG. 1 in which a single small band gap semiconductor can not drive a room temperature electrolysis reaction, however two semiconductors, separately illuminated, can drive electrolysis. These semiconductors can be the same (e.g. series connected Si cells), or semiconductors which can respond to different portions of the solar spectrum (multiple band gap semiconductors), each utilizing a separate, visible photon flux. The advancement of such studies had focused on tuning the semiconductor bandgap to provide a better match to the electrochemical potential (specifically, the water splitting potential).

Figure 1:
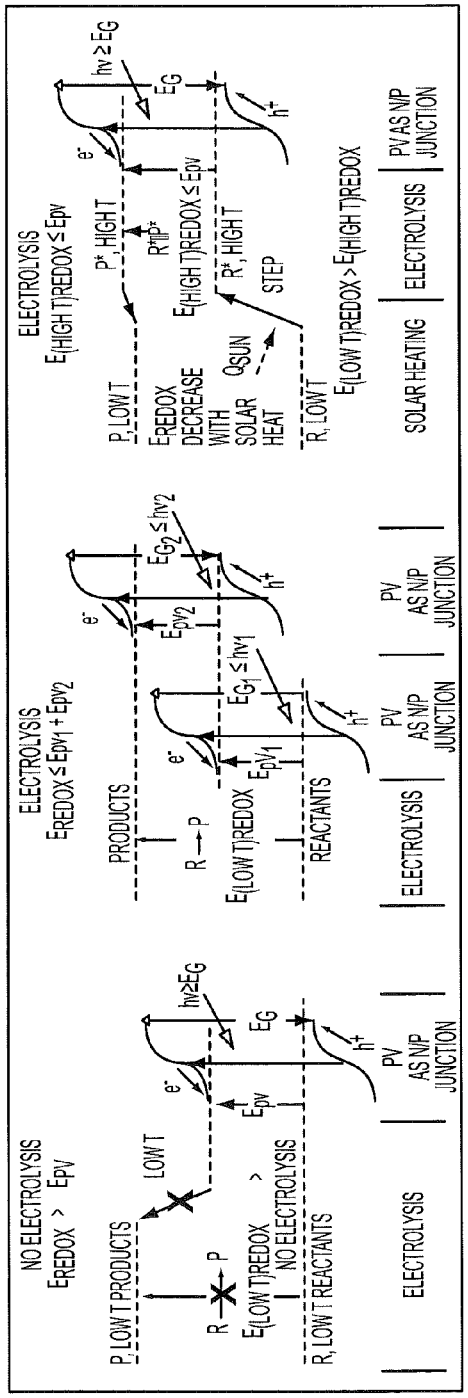
FIG. 1 shows a comparison of the STEP (Solar Thermal, Electrochemical and Photo) (right), multi-PV (middle) and ambient temperature (left) solar driven electrolysis energy diagrams.

Rather than tuning the bandgap to provide a better energetic match to the electrolysis potential, the STEP process instead tunes the redox potential to match the bandgap. The right side of FIG. 1 presents the first energy diagram for a STEP process. The STEP process uses both visible and thermal solar energy for higher efficiency. The process uses this thermal energy for the indicated step decrease of the necessary electrolysis energy and forms an energetically allowed pathway to drive electrochemical charge transfer. STEP's high temperature pathway decreases the thermodynamic energy requirements for processes whose electrolysis potential decreases with increasing temperature. STEP can be more efficient than other solar energy conversion processes, as it utilizes not only the visible sunlight used to drive photovoltaic cells (PV), but also utilizes the previously detrimental (due to PV thermal degradation) thermal component of sunlight, for the electrolytic formation of chemicals. The STEP process distinguishes radiation that is intrinsically energy sufficient (super-bandgap, $h\nu \geq E_g$), or insufficient (sub-bandgap), to drive PV charge transfer, and applies excess solar thermal energy to heat the electrolysis reaction chamber. On the right side of the figure, excess solar thermal energy provides heat to decrease the redox potential, while super-bandgap photons generate electronic charge with sufficient energy to drive the electrolytic formation of energetic molecules. On the left side, without this solar heat, the same solar driven electronic charge is insufficient to drive electrolysis. The extent of the decrease in the electrolysis potential, $E_{redox}$, may be tuned (will vary) with the temperature.

Figure 2:
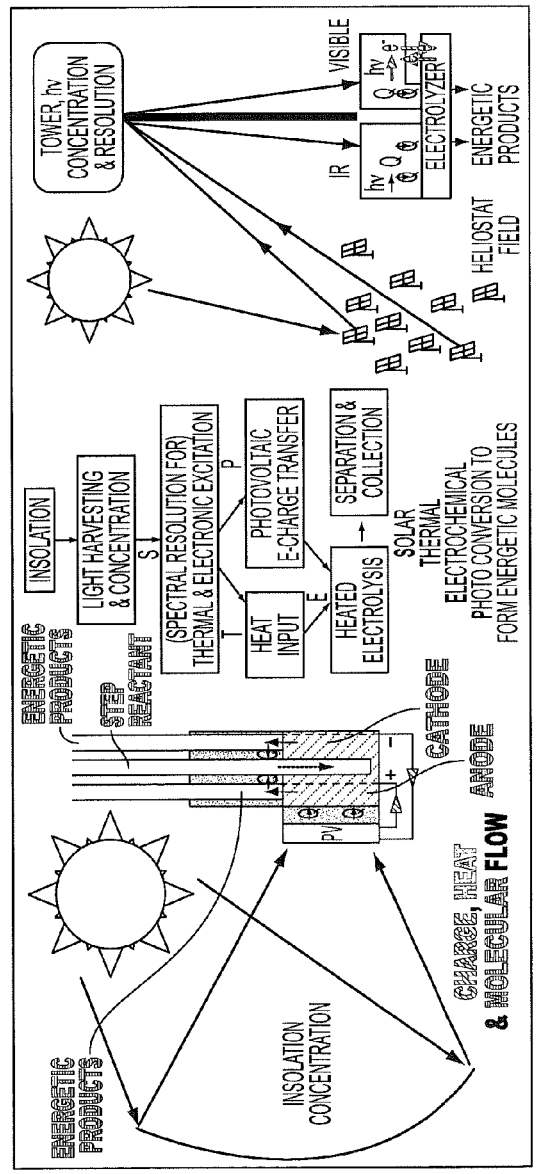
FIG. 2. The global use of the solar spectra to drive the formation of energy rich molecules.

FIG. 2 summarizes the charge, heat and molecular flow for the STEP process; the high temperature pathway decreases the thermodynamic energy requirements for processes whose electrolysis potential decreases with increasing temperature, and also facilitates charge transfer (i.e., decreases kinetic overpotential losses), which arise during electrolysis. On the left of FIG. 2 charge and heat flow in the Solar Thermal, Electrochemical and Photo system is shown. Arrows with different shading indicate the direction of heat flow, electron flow, and reagent (molecular) flow. On the right FIG. 2 shows auxiliary components to reach higher STEP temperatures and/or decrease the heat incident on the photovoltaic cell (PV). Light harvesting can use various optical concentrators and beam splitters can redirect sub-bandgap radiation away from the PV onto the electrolyzer. This process comprises (i) sunlight harvesting and concentration, (ii) electron/hole separation and electronic charge transfer driven by super-bandgap energy in the photovoltaic, (iii) transfer of sub-bandgap and excess super-bandgap radiation to step up heat to the electrolysis chamber, (iv) high temperature, low energy electrolysis forming energy rich products, and (v) cycle completion by pre-heating of the electrolysis reactant through heat exchange with the energetic electrolysis products. As indicated on the right side of FIG. 2, the light harvesting can use various optical configurations; e.g. in lieu of parabolic, or Fresnel, concentrators, a heliostat/solar tower with secondary optics can achieve higher STEP process temperatures (>1000° C.) with concentrations of ~2000 suns. Beam splitters can redirect sub-bandgap radiation away from the PV (minimizing PV heating) for a direct heat exchange with the electrolyzer.

Identification of STEP Consistent Endothermic Processes.

Solar heating can decrease the energy to drive a range of electrolysis processes. The electrochemical driving force for synthesis of a variety of chemicals of widespread use by society is shown to significantly decrease with increasing temperature. Such processes can be determined using available entropy, S, and enthalpy, H, and free-energy, G, data, and are identified by their negative isothermal temperature coefficient of the cell potential. This coefficient $(dE/dT)_{isoth}$ is the derivative of the electromotive force of the isothermal cell:

$$(dE/dT)_{isoth} = \Delta S/nF = (\Delta H - \Delta G)/nFT \quad (1)$$

The starting process of modeling any STEP process is the conventional expression of a generalized electrochemical process, in a cell which drives an n electron charge transfer electrolysis reaction, comprising "x" reactants, $R_i$, with stoichiometric coefficients $r_i$, and yielding "y" products, $C_i$, with stoichiometric coefficients $c_i$.

Electrode 1|Electrolyte|Electrode|2

Using the convention of $E=E_{cathode}-E_{anode}$ to describe the positive potential necessary to drive a non-spontaneous process, by transfer of n electrons in the electrolysis reaction:

n electron transfer electrolysis reaction:
$$\Sigma_{i=1 \, to \, x} r_i R_i \rightarrow \Sigma_{i=1 \, to \, y} c_i C_i \quad (2).$$

At any electrolysis temperature, $T_{STEP}$, and at unit activity, the reaction has electrochemical potential, $E°_T$. This may be calculated from consistent, compiled unit activity thermochemical data sets, such as the NIST condensed phase and fluid properties data sets, as:

$$E°_T = -\Delta G°(T=T_{STEP})nF; \; E°_{ambient} \equiv E°_T(T_{ambient});$$
here $T_{ambient}=298.15K=25°$ C., and:

$$\Delta G°(T=T_{STEP}) \Sigma_{i=1 \, to \, y} c_i (H°(C_i,T)-TS°(C_i,T)) - \Sigma_{i=1 \, to \, x} r_i (H°(R_i,T)-TS°(R_i,T)) \quad (3)$$

Figure 3:
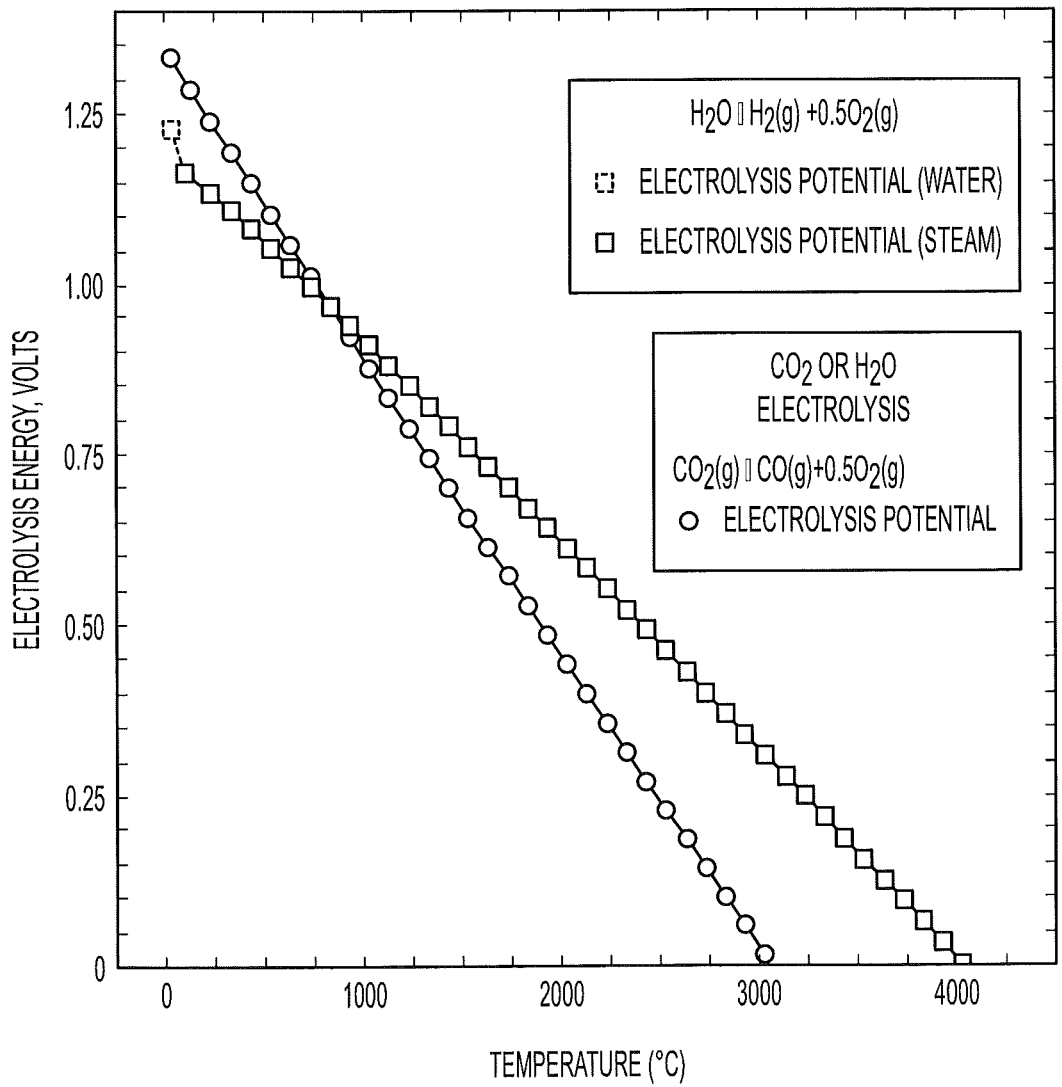
FIG. 3 shows the calculated potential needed to electrolyze carbon dioxide or water.

As calculated and summarized in FIG. 3, the electrochemical driving force for electrolysis of carbon dioxide and water, significantly decreases with increasing temperature. The ability to remove $CO_2$ from exhaust stacks or atmospheric sources, provides a constructive response to linked environmental impacts, including global warming due to anthropogenic $CO_2$ emission. From the known thermochemical data for $CO_2$, CO and $O_2$, and in accord with eq. 1, $CO_2$ splitting can be described by:

$$CO_2(g) \rightarrow CO(g) + \tfrac{1}{2}O_2(g);$$

$$E°_{CO_2split} = (G°_{CO} + 0.5 G°_{O_2} - G°_{CO_2})/2F; \; E° \, (25° \, C.) = 1.333V \quad (4).$$

$CO_2$ can also be split into other higher energy carbon products (carbon compounds having an energy greater than $CO_2$, such as carbon:

$$CO_2 \rightarrow C + O_2.$$

High energy carbon products can also be split from a carbonate salt, for example:

$$M_2CO_3 \rightarrow CO + M_2O + \tfrac{1}{2}O_2$$

$$M_2CO_3 \rightarrow C + M_2O + O_2$$

wherein M is a counterion such as a metal cation, an organic cation, a nitrogen containing cation or a phosphorous containing cation.

FIG. 3 shows the calculated potential needed to electrolyze carbon dioxide or water. The indicated decrease in electrolysis energy, with increase in temperature, provides energy savings in the STEP process. High temperature is accessible through excess solar heat. Energies of electrolysis are calculated from eq. 3, using thermochemical data at unit activity from NIST gas and condensed phase Shomate equations.[13] Axes are extended to high temperature where $\Delta G$ is zero. As seen in FIG. 3, the $CO_2$ splitting potentials decrease more rapidly with temperature than those for water splitting, signifying that the STEP process may be readily applied to $CO_2$ electrolysis. Efficient, renewable, non-fossil fuel energy rich carbon sources are needed, and the product of eq. 4, carbon monoxide, is a significant industrial gas with a myriad of uses, including the bulk manufacturing of acetic acid and aldehydes (and detergent precursors), and for use in industrial nickel purification. To alleviate challenges of fossil-fuel resource depletion, CO is an important syngas component and methanol is formed through the reaction with $H_2$. The ability to remove $CO_2$ from exhaust stacks or atmospheric sources, also provides a constructive response to linked environmental impacts, including global warming due to anthropogenic $CO_2$ emission. Based on the analogous experimental hybrid photo-thermal electrochemical water electrolysis design, the first $CO_2$ STEP process consists of solar driven and solar thermal assisted $CO_2$ electrolysis. In particular, in a molten carbonate bath electrolysis cell, fed by $CO_2$.

cathode: $2CO_2(g)+2e^- \rightarrow CO_3^=(molten)+CO(g)$ anode: $CO_3^=(molten) \rightarrow CO_2(g)+\frac{1}{2}O_2(g)+2e^-$ cell: $CO_2(g) \rightarrow CO(g) \rightarrow CO(g)+\frac{1}{2}O_2(g)$ (5)

Molten alkali carbonate electrolyte fuel cells typically operate at 650° C. Li, Na or K cation variation can affect charge mobility and operational temperatures. Sintered nickel often serves as the anode, porous lithium doped nickel oxide often as the cathode, while the electrolyte is suspended in a porous, insulating, chemically inert $LiAlO_2$ ceramic matrix.

The STEP process can be used to favor the formation of products for electrolyses characterized by a negative isothermal temperature coefficient, but will not improve the efficiency of heat neutral or exothermic reactions. An example of this restriction occurs for the electrolysis reaction currently used by industry to generate chlorine. During 2008, the generation of chlorine gas (principally for use as bleach and in the chlor-alkali industry) consumed approximately 1% of the world's generated electricity, prepared in accord with the industrial electrolytic process:

$2NaCl+2H_2O \rightarrow Cl_2+H_2+2NaOH$; $E°(25° C.)=1.502$ V (6)

Figure 4:
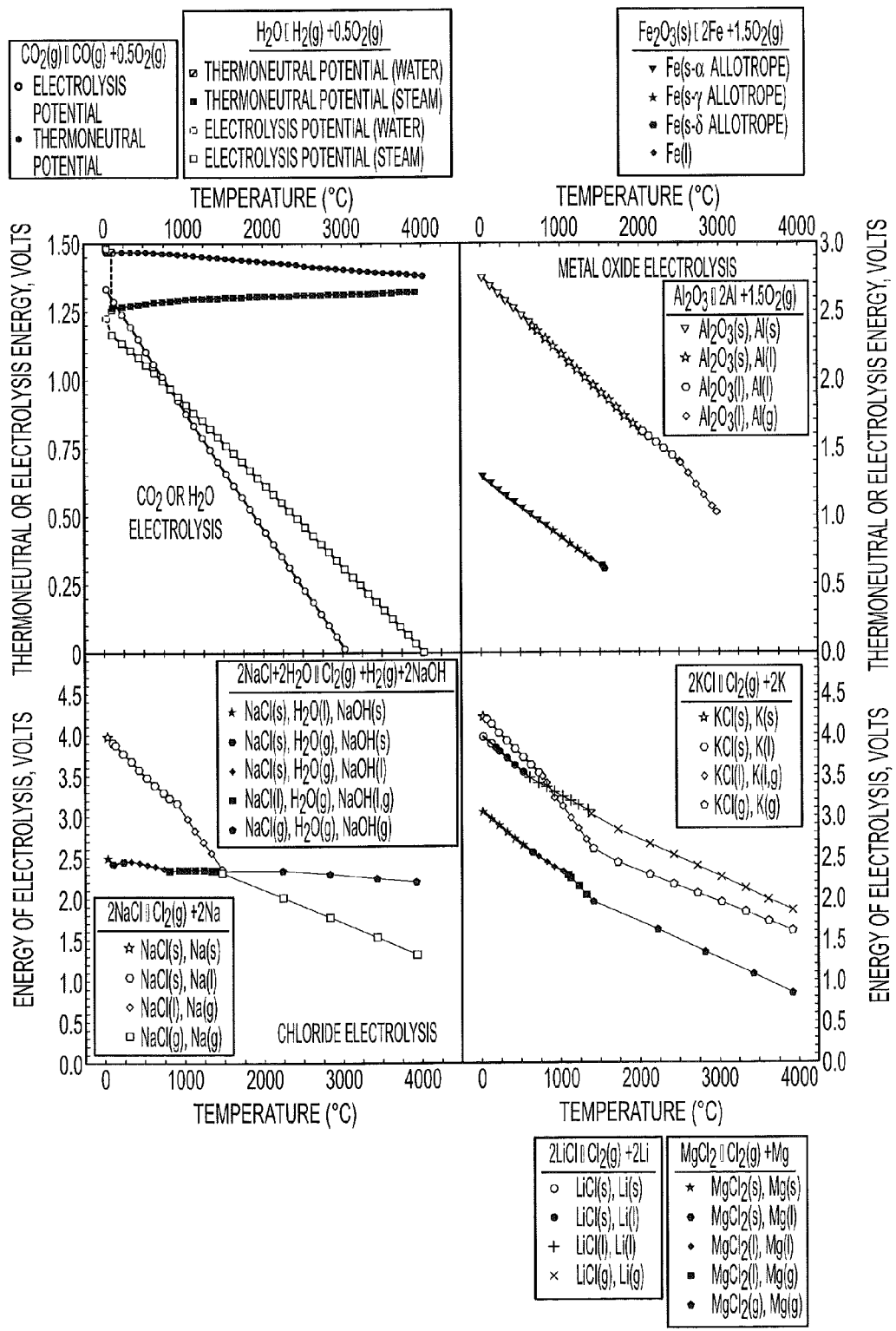
FIG. 4 shows the calculated potential to electrolyze selected oxides (top) and chlorides (bottom).

FIG. 4 shows the calculated potential to electrolyze selected oxides (top) and chlorides (bottom). The indicated decrease in electrolysis energy, with increase in temperature, provides energy savings in the STEP process in which high temperature is provided by excess solar heat. Energies of electrolysis are calculated from eq. 3, with consistent thermochemical values at unit activity using NIST gas and condensed phase Shomate equations. Note with water excluded, the chloride electrolysis decreases (in the lower left of the figure). All other indicated electrolysis potentials, including that of water or carbon dioxide, decrease with increasing temperature. Thermoneutral potentials are calculated with eq. 15. In the lower left portion of FIG. 4, the calculated electrolysis potential for this industrial chlor-alkali reaction exhibits little variation with temperature, and hence the conventional generation of chlorine by electrolysis would not benefit from the inclusion of solar heating. This potential is relatively invariant, despite a number of phase changes of the components (indicated on the figure and which include the melting of NaOH or NaCl). However, as seen in the figure, the calculated potential for the anhydrous electrolysis of chloride salts is endothermic, including the electrolyses to generate not only chlorine, but also metallic lithium, sodium and magnesium, and can be greatly improved through the STEP process:

$M_xCl_y \rightarrow y/2Cl_2+xM$; $E°_{M_xCl_y,split}(25° C.)=X$ (7)

For x=1 and n=1, X=3.98V when M=Na, X=4.24V when M=K, X=3.98V when M=Li,
And for x=1 and z=2, X=3.07V when M=Mg.
By way of example, equation 7 is written with a monovalent cation, such as with alkali metals, or ammonium, but chlorine can also be formed through the reduction of alkaline earth metal chlorides, such as calcium chloride, $CaCl_2$, or other metal chlorides, and in general through the reduction of salts of the form $M_xCl_y$, where M is a metal cation, organic cation, a nitrogen containing cation or a phosphorous containing cation. Additionally, the values for X presented above in relation to Example 7 are thermodynamically derived and may be subject to some experimental variability.

The calculated decrease for the anhydrous chloride electrolysis potentials are on the order of volts per 1000° C. temperature change. For example, from 25° C. up to the $MgCl_2$ boiling point of 1412° C., the $MgCl_2$ electrolysis potential decreases from 3.07 V to 1.86 V. This decrease provides a theoretical basis for significant, non $CO_2$ emitting, non-fossil fuel consuming STEP processes for the generation of chlorine and magnesium, and occurring at high solar efficiency analogous to the similar $CO_2$ STEP process.

The STEP process has been derived for the efficient solar removal/recycling of $CO_2$. In addition, thermodynamic calculation of metal and chloride electrolysis rest potentials isolates electrolytic processes which are consistent with endothermic STEP processes for the formation of iron, chlorine, aluminum, lithium, sodium and magnesium, via $CO_2$-free pathways. As shown, the conversion and replacement of the conventional, aqueous, industrial alkali-chlor process, with an anhydrous electrosynthesis, results in a redox potential with a calculated decrease of 1.1 V from 25° C. to 1000° C. As another example, the replacement of the conventional chemical process of iron reduction with an electrochemical reaction results in a potential which drops from 1.3 V to 0.8 V. The significant redox potential decrease of these $CO_2$-free processes is consistent with STEP solar energy conversion efficiencies in accord with the $CO_2$ analogy.

As seen in the top right of FIG. 4, the calculated electrochemical reduction of metal oxides can exhibit a sharp, smooth decrease in redox potential over a wide range of phase changes. These endothermic processes provide an opportunity for the replacement of conventional industrial processes by the STEP formation of these metals. The iron and steel industry accounts for a quarter of industrial direct $CO_2$ emissions, principally generated when iron ore is reduced in the reaction with carbon. In 2008, industrial electrolytic processes consumed approximately 5% of the worlds electricity, including for aluminum (3%), chlorine (1%), and lithium, magnesium and sodium production. This 5% of the global $19 \times 10^{12}$ kWh of electrical production, is equivalent to the emission of $6 \times 10^8$ metric tons of $CO_2$.[1] Currently, iron is predominantly formed through the reduction of hematite with carbon, emitting $CO_2$:

$Fe_2O_3+3C+3/2O_2 \rightarrow 2Fe+3CO_2$ (8)

A non-$CO_2$ emitting alternative is provided by the STEP driven electrolysis of $Fe_2O_3$:

$Fe_2O_3 \rightarrow 2Fe+3/2O_2$; $E°(25° C.)=1.284$ V (9)

As seen in the top right of FIG. 4, the calculated iron generating electrolysis potentials drops 0.5 V (a 38% drop) from 25° C. to 1000° C., and as with the $CO_2$ analogue, will be expected to decrease more rapidly with non-unit activity conditions, as will be delineated in a future study. Conventional industrial processes for these metals and chlorine, along with $CO_2$ emitted from power and transportation, are responsible for the majority of anthropogenic $CO_2$ release. The STEP process, to efficiently recover carbon dioxide and in lieu of these industrial processes, can provide a transition beyond the fossil fuel-electric grid economy.

STEP Limiting Equations.

Compiled thermochemical data, such as the NIST condensed phase and fluid properties data sets, are often based on different reference states, while a consistent reference state is needed to understand electrolysis limiting processes, including water. This challenge is overcome by simple variation of the unit activity (a=1) consistent calculated electrolysis potential to determine the potential at other reagent and product relative activities via the Nernst equation. Electrolysis provides control of the relative amounts of reactant and generated product in a system. A substantial activity differential can also drive STEP improvement at elevated temperature, and will be derived. The potential variation with activity, a, of the reaction: $\Sigma_{i=1\ to\ x} r_i R_i \rightarrow \Sigma_{i=1\ to\ y} c_i C_i$, is given by:

$$E_{T,a} = E°_T - (RT/nF) \cdot \ln(\Pi_{i=1\ to\ x} a(R_i)^{r_i} / \Pi_{i=1\ to\ y} a(C_i)^{c_i}) \quad (10)$$

As illustrated on the left side of FIG. 2, the ideal STEP electrolysis potential incorporates not only the enthalpy needed to heat the reactants to $T_{STEP}$ from $T_{ambient}$, but also the heat recovered via heat exchange of the products with the inflowing reactant. In this derivation it is convenient to describe this combined heat in units of voltage via the conversion factor nF:

$$Q_T = \Sigma_i H_i(R_i, T_{STEP}) - \Sigma_i H_i(R_i, T_{ambient}) - \Sigma_i H_i(C_i, T_{STEP}) + \Sigma_i H_i(C_i, T_{ambient});$$

$$E_Q(V) = -Q_T(J/mol)/nF \quad (11)$$

The energy for the STEP process, incorporates $E_T$, $E_Q$, and the non-unit activities, via inclusion of eq. (11) into eq. (10), and is termed the STEP potential, $E_{STEP}$:

$$E_{STEP}(T,a) = [-\Delta G°(T) - Q_T - RT \cdot \ln(\Pi_{i=1\ to\ x} a(R_i)^{r_i} / \Pi_{i=1\ to\ y} a(P_i)^{p_i})]/nF;$$

$$E°_{STEP}(a=1) = E_T + E_Q \quad (12)$$

In a pragmatic electrolysis system, product(s) can be drawn off at activities that are less than that of the reactant(s). This leads to large activity effects in eq. 12 at higher temperature, as the RT/nF potential slope increases with T (e.g. increasing 3-fold from 0.0592V/n at 25° C. to 0.183V/n at 650° C.).

The STEP factor, $A_{STEP}$, is the extent of improvement in carrying out a solar driven electrolysis process at $T_{STEP}$, rather than at $T_{ambient}$. For example, when applying the same solar energy, to electronically drive the electrochemical splitting of a molecule which requires only two thirds the electrolysis potential at a higher temperature, then $A_{STEP} = (2/3)^{-1} = 1.5$. In general, the STEP factor is given by:

$$A_{STEP}(=E_{STEP}(T_{ambient}, a)/E_{STEP}(T_{STEP}, a);\ e.g.\ T_{ambient} = 298K \quad (13)$$

The STEP solar efficiency, $\eta_{STEP}$, is constrained by both photovoltaic and electrolysis conversion efficiencies, $\eta_{PV}$ and $\eta_{electrolysis}$, and the STEP factor. In an operational STEP system, passage of electrolysis current requires an additional, combined (anodic and cathodic) overpotential above the thermodynamic potential; that is $V_{redox} = (1+\zeta)E_{redox}$. Mobility and kinetics improve at higher temperature and $\zeta(T > T_{ambient}) < \zeta(T_{ambient})$. Hence, a lower limit of $\eta_{STEP}$ ($V_T$) is given by $\eta_{STEP-ideal}(E_T)$. At $T_{ambient}$, $A_{STEP} = 1$, yielding $\eta_{STEP}(T_{ambient}) = \eta_{PV} \eta_{electrolysis}$. $\eta_{STEP}$ is additionally limited by entropy and black body constraints on maximum solar energy conversion efficiency. Consideration of a black body source emitted at the sun's surface temperature and collected at ambient earth temperature, limits solar conversion to 0.933 when radiative losses are considered, which is further limited to $\eta_{PV} < \eta_{limit} = 0.868$ when the entropy limits of perfect energy conversion are included. These constraints on $\eta_{STEP-ideal}$ and the maximum value of solar conversion, are imposed to yield the solar chemical conversion efficiency, $\eta_{STEP}$:

$$\eta_{STEP-ideal}(T,a) = \eta_{PV} \eta_{electrolysis} \cdot A_{STEP}(T,a)$$

$$\eta_{STEP}(T,a) = \eta_{PV} \eta_{electrolysis}(T_{ambient}, a) \cdot A_{STEP}(T,a); \quad (\eta_{STEP} < 0.868) \quad (14)$$

As calculated from eq. 3 and the thermochemical component data, and as presented in FIG. 4, the electrochemical driving force for a variety of chemicals of widespread use by society, including aluminium, iron, magnesium and chlorine, significantly decreases with increasing temperature.

Accessible STEP Process Temperatures.

Electrolysis systems with a negative isothermal temperature coefficient tend to cool as the electrolysis products are generated. Specifically in endothermic electrolytic processes, the eq. 10 free-energy electrolysis potential, $E_T$, is less than the enthalpy based potential. This latter value is the potential at which the system temperature would remain constant during electrolysis. This thermoneutral potential, $E_{tn}$, is given by:

$$E_{tn}(T_{STEP}) = -\Delta H(T)/nF;\ \Delta H(T_{STEP}) = \Sigma_{i=1\ to\ b} c_i H(C_i, T_{STEP}) - \Sigma_{i=1\ to\ a} r_i H(R_i, T_{STEP}) \quad (15)$$

The top left of FIG. 4 includes calculated thermoneutral potentials for $CO_2$ and water splitting reactions. At ambient temperature, the difference between $E_{tn}$ and $E_T$ does not indicate an additional heat requirement for electrolysis, as this heat is available via heat exchange with the ambient environment. At ambient temperature, $E_{tn} - E_T$ for $CO_2$ or water is respectively 0.13 and 0.25 V, and (not shown) is calculated as 0.15±0.1 V for $Al_2O_3$ and $Fe_2O_3$, and 0.28±0.3 V for each of the chlorides.

Potential and power match of hybrid photo-thermal electrochemical processes is accomplished by varying their series and/or parallel arrangement. Insolation concentration facilitates both the high temperature and the high solar conversion efficiencies of the STEP process, and decreases the required PV surface area. With sunlight concentration, single bandgap PVs based on GaAs and Si, have respectively achieved efficiencies of 27.8% and 27.3%, and 40.1% for a GaInP/GaS/GaInAs multiple bandgap PV. We had derived an estimate of the fraction of incident solar radiation required to heat a solar water electrolysis process based on (i) the available sub-bandgap insolation, (ii) the thermoneutral potential, (iii) the electrolysis potential, and (iv) constrained by the equivalence of the electrolysis and photocurrents throughout the system. A process with lower thermal conversion efficiency requires more solar heating, while a process with lower photovoltaic efficiency drives a lower rate of electrolysis and requires less solar heating.

In principal, as will be evidenced by the small, calculated values of $E_Q$, there is a near balance between heating of the STEP electrolysis reactants, and the heat recovered from the STEP products, respectively denoted as $Q_R$ and $Q_C$. In practice, the recovery by heat exchange is incomplete and the thermoneutral potential provides a useful guide to requisite heat. As illustrated on the right side of FIG. 1, additional heat, $Q_{IR}$, is available from the sub-bandgap (IR) energy, as well from the super-bandgap, $Q_{PV}$, heat not utilized by the photovoltaic, $Q_{PV}$. $Q_{PV}$ consists of the total of three super-bandgap ($E_{hv} > E_{bandgap}$) insolation components: (1) the radiation not absorbed by the PV, (2) the insolation absorbed but released via thermalization, as well as (3) the heat regenerated in electron/hole recombination. Together, $Q_{IR}$ and $Q_{PV}$ can be captured at a limited thermal efficiency of $\eta_{thermal}$. In practice heat is also needed to maintain the nonactive electrolysis components at $T_{STEP}$, while additional heat is produced in generating the electrolysis current, i, at overpotential, ξ. These latter, opposing heats are grouped together as $Q_{Electrolyze}$. In total, the primary heat balance for the STEP process may be described as: $Q_{STEP}=Q_{IR}+Q_{PV}-Q_R+Q_C-Q_{Electrolyzer}$.

Higher maximum process temperatures, and hence higher solar conversion efficiencies, are accessible than estimated in our previous hybrid solar (hydrogen) electrochemical model. Excess heat is detrimental to conventional photovoltaics; instead this excess super-bandgap insolation can be constructively applied to heat STEP processes. Here, this excess super-bandgap insolation is also directed to heating the electrolysis chamber. In that previous study a range of photovoltaic and thermal conversion $\eta_{PV}$ and $\eta_{heat}$ efficiencies were considered, and in that previous derivation, the bandgap and the photovoltaic conversion efficiency were considered as separate constraints. However, $\eta_{PV}$ fully constrains the excess insolation. Hence, as a further improvement, only the photovoltaic conversion efficiency value, and not the bandgap, will be needed in the derivation which follows.

Without being bound by theory, this derivation determines the maximum accessible temperature for an endothermic STEP process, $T_{max}$, by deriving the electrolysis potential, $E_{redox}$, which can be sustained at that temperature. The electrolysis potential is directly related to the known temperature dependence of the thermodynamic free energy. The temperature at which a given redox potential occurs can be defined as the inverse function, $\Phi(E_{redox})=T$. These functions tend to be highly linear, and are particularly well represented over large temperature domains (domains constrained by temperatures at phase changes occur for reactants or products) by fifth order polynomials. For example a fifth order polynomial fit, $T=\Phi(E_{redox})$ of the water redox rest potential (calculated from the NIST thermochemical free energy data at 1 bar), may be compared to the data in FIG. 3, and generates the redox potential's correct temperature variation to within ±3° C., over the range from 100 to 4127° C. as:

$$\Phi(°C.)=T(x=E_{redox})=a+bx+cx^2+dx^3+ex^4+fx^5; \ a\text{-}f \text{ are given in Table 1} \quad (16)$$

In this derivation, $E_{redox}(T_{max})$ is determined from first principles, and then $T_{max}$ determined from the inverse function $\Phi(E_{redox})=T$. The system will be assumed to be constrained by a known photovoltaic efficiency, $\eta_{phot}$, a known thermal efficiency, $\eta_{therml}$, and a known relative electrolysis overpotential, ξ. The only additional constraint needed to calculate $T_{max}$ is then the function $\Phi(E_{redox})=T$, including the point $E°_{redox}(25°C.)$.

Electrolysis at a finite current generates heat, and requires a potential greater than the redox potential, that is $V_{redox}>E_{redox}$. When there is no electrolysis, there is no heat loss or heat gain. When (endothermic) electrolysis occurs, additional energy heat can be required to prevent system cooling. For an endothermic electrolysis process, the energy of cooling is the difference between the thermoneutral (enthalpy constrained), $E_{tneut}$, and the electrolysis (free energy constrained) potentials, $E_{redox}$. The external environment provides a near infinite heat source to prevent cooling below the temperature of the ambient environment. Hence, when room temperature electrolysis occurs, endothermic cooling may be minimized via heat exchange with the environment. Here, room temperature is considered 25° C., therefore:

$$E_{ambient}=E_{tneut}-E_{redox}(25°C.) \quad (17)$$

For an endothermic process occurring at $T_{max}>25°C.$, $E_{heat}$ is the minimum additional heat energy, beyond that available from the ambient sink, to prevent electrolytic cooling. For reactants introduced at ambient temperature (and products ultimately recovered at this room temperature), the thermoneutral potential represents the total minimum energy to prevent system cooling. In the STEP process, this is comprised of the available ambient heat energy, the applied potential, plus heat introduced during the redox process at $E_{heat}$.

$$E_{heat}=E_{ambient}+V_{redox}(T_{max})+E_{heat} \quad (18)$$

Note $E_{heat}$ will further decrease when hot source reactants are available, such as $CO_2$ in smoke exhaust. Substitution of eq. 17 into eq. 18, and rearrangement, expresses the minimum STEP heat energy required to maintain steady electrolysis temperature conditions. Note that this energy varies linearly with the applied STEP electrolysis potential, and that use of the ambient heat sink makes this independent of the thermoneutral potential:

$$E_{heat}=E°_{redox}(25°C.)-V_{redox}(T_{max}) \quad (19)$$

A solar photovoltaic converts only a fraction of the incident sunlight energy to electrical energy. If $\eta_{phot}$ is this fraction of the insolation converted by the solar cell, then $(1-\eta_{phot})P_{sun}$ is the incident solar energy not used by the solar cell. If we transfer the unused insolation power into the electrolysis chamber at efficiency $\eta_{therml}$, then the available solar power to heat the electrolysisis chamber, $P_{heat}$, is:

$$P_{heat}=(1-\eta_{phot})(\eta_{therml})P_{sun} \quad (20)$$

Electrolysis is driven by electronic charge. The electrolysis power is the available power of electronic charge applied to carry out redox charge transfer, $P_{electronic}=P_{redox}$. For solar photovoltaic driven charge transfer, the maximum electronic power is determined by the conventional solar efficiency of the photovoltaic, $\eta_{phot}$, and yields a power that is the product of the insolation power, $P_{sun}$, with $\eta_{phot}$, that is $P_{electronic}=\eta_{phot}P_{sun}$. For the maximum efficiency STEP process, this power is used to drive electrolysis at $P_{electronic}=P_{redox}=i_{redox}V_{redox}$; that is upon rearrangement:

$$i_{redox}=\eta_{phot}P_{sun}/V_{redox}(T_{max}) \quad (21)$$

The additional heat required to maintain STEP temperature stability varies with the rate of electrolysis. At the rate $i_{redox}$, if additional heat at $E_{heat}$ is required to prevent system cooling, it must therefore flow in at power, $i_{redox}·E_{heat}=P_{heat}$. Hence, division of eq. 20 by eq. 21 yields:

$$E_{heat}=P_{hea}/i_{redox}=V_{redox}(T_{max})·\eta_{therml}(\eta_{phot}^{-1}-1) \quad (22)$$

Note, that unlike eqs. 20 and 21, eq. 22 is independent of solar intensity, as the extent of sunlight power required for heating varies linearly with the rate of redox, and therefore cancels in this latter equation. Eq. 22, upon substitution into eq. 19 and solution for $V_{redox}$, yields:

$$V_{redox}(T_{max})=E°_{redox}(25°C.)/[1+\eta_{therml}(\eta_{phot}^{-1}-1)] \quad (23)$$

Passage of electrolysis current requires a combined (anodic and cathodic) relative overpotential above the thermodynamic potential; that is $V_{redox}=(1+\zeta)E_{redox}$, which upon substitution into eq. 23 and solution for $E_{redox}$:

$$E_{redox}(T_{max})=B_{STEP}·E°_{redox}(25°C.) \quad (24)$$

$$\text{where } B_{STEP}^{-1}=(1+\zeta)[1+\eta_{therml}(\eta_{phot}^{-1}-1)] \quad (25)$$

Hence, for a process occurring under conditions of $\zeta$, $\eta_{phof}$ and $\eta_{therml}$, we can determine from eq. 24 the thermodynamic electrolysis potential accessible by the STEP process. Note that if the ambient heat sink is not available, then in lieu of eq. 18, $E_{tneut}=V_{redox}(T_{max})+E_{heat}$, and then the available heat is constrained by:

$$E'_{redox}(T_{max})=B_{STEP} \cdot E_{tneut}(25°\,C.) \qquad (26)$$

$B_{STEP}$ is calculated from eq. 25 for a wide range of $\zeta$, $\eta_{phof}$ and $\eta_{therml}$, conditions and summarized in Table 2. In the calculations of the maximum accessible STEP process temperatures, the widest range of heat losses will be considered, using thermal efficiencies of only 10%, 30% or 50% as described in Table 2. If the functional variation of the temperature with the known thermodynamic rest potential is given by $\Phi(E_{redox})$, then the maximum accessible temperature for a STEP system is given from eq. 24 as:

$$T_{max}(E_{redox})=\Phi(x=B_{STEP} \cdot E°_{redox}(25°\,C.)) \qquad (27)$$

For example, using the fifth order polynomials determined from the variation of the redox potentials, the maximum accessible STEP temperatures for water and $CO_2$ electrolyses are respectively determined from eq. 10, using values of a-f presented in Table 1, and values of $B_{STEP}$ summarized in Table 2:

$$T_{max}(H_2O,°\,C.)=a+bx+cx^2+dx^3+ex+fx^5;\ x=B_{STEP} \cdot 1.229 \qquad (28)$$

$$T_{max}(CO_2,°\,C.)=a+bx+cx^2+dx^3+ex+fx^5;\ x=B_{STEP} \cdot 1.333 \qquad (29)$$

Figure 5:
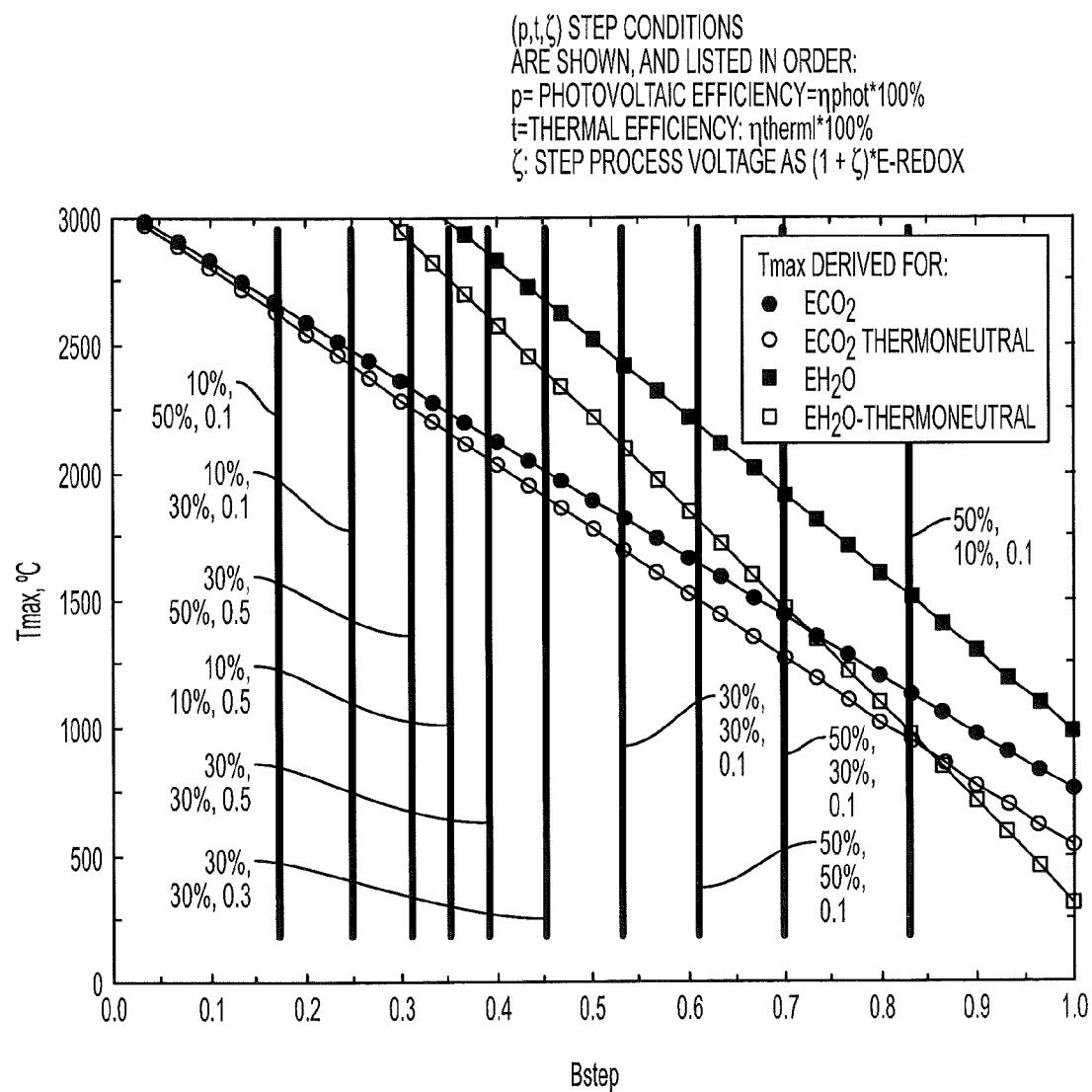
FIG. 5 shows accessible STEP process temperatures under various conditions for the conversion of $CO_2$ to CO and $O_2$, or $H_2O$ to $H_2$ and $O_2$.

FIG. 5 shows accessible STEP process temperatures under various conditions for the conversion of $CO_2$ to CO and $O_2$, or $H_2O$ to $H_2$ and $O_2$. STEP process temperatures are calculated with from the redox potentials from eqs. 29 (for $CO_2$) or 28 (for $H_2O$) or from eq. 26 (from the thermoneutral potential). Presented in FIG. 5 are the maximum accessible temperatures for $H_2O$ and $CO_2$ STEP processes under various conditions of $\zeta$, $\eta_{phot}$ and $\eta_{therml}$. Less solar thermal energy is available to heat the electrolysis chamber under conditions of low thermal efficiency and low overpotential, and higher photovoltaic efficiency conditions also leaves less solar energy for heating. As seen in Table 1, these low heating conditions lead to high values of $B_{STEP}$. On the other hand, a high degree of heating occurs under conditions of high thermal efficiency, high overpotential and low photovoltaic efficiency. In accord with these conditions, it is seen in FIG. 5 that low $B_{STEP}$ values lead to high, sustainable STEP electrolysis temperatures.

As evident in FIG. 5, the highest temperature domain is calculated under the conditions of low $\eta_{phot}$, and high $\zeta$ and $\eta_{therml}$ approach conditions. Under these conditions, the vast majority of insolation can be directed to STEP process heating, and with appropriate secondary optics, high temperatures are expected. Interestingly, the high temperatures calculated are consistent with those predicted for efficient, pure solar thermal systems, using high domain solar concentration (with 1000-10000 suns) optics.

It is also evident from the eq. 28 and 29 calculations, and as seen in FIG. 5, that in general the accessible maximum STEP temperatures, $T_{max}(H_2O)$ and $T_{max}(CO_2)$, are more than sufficient to sustain high temperature electrolysis reactions. This includes the domain above 300° C. as necessary for molten hydroxide electrolytes, above 650° C. commonplace in molten carbonate systems, and even temperatures of 1000° C. used in many solid oxide systems.

Table 1 shows the optimized polynomial fit of the variation of the temperature as a function of the electrolysis redox potential, where $\Phi(°\,C.)=T(x=E_{redox})=a+bx+cx^2+dx^3+ex+fx^5$. The redox potential is calculated from NIST thermodynamic data in ref. 13. The maximum deviation in, $\Delta T=T_{fit}-\Phi(°\,C.)$, for $H_2O$ is ±3° C., over the fit range (from 100 to 4127° C.), and for $CO_2$ is ±2° C., over the range (from 100 to 6000° C.).

TABLE 1

| Electrolysis; P; $T_{fit}$ range | a | b | c | d | e | f |
|---|---|---|---|---|---|---|
| $H_2O \rightarrow H_2 + \frac{1}{2} O_2$; 1 bar $H_2O$; 100-4127° C. | 4036.5 | −3284.7 | 255.05 | −969.39 | 1240.4 | −558.14 |
| $CO_2 \rightarrow CO + \frac{1}{2} O_2$; 1 bar $H_2O$; 25-6000° C. | 3066.4 | −2379.6 | 52.864 | 17.07 | 3.0942 | −2.7898 |

Table 2 shows $B_{STEP}$ calculated from eq. 25 for various conditions of $\zeta$, $\eta_{phot}$ and $\eta_{therml}$.

TABLE 2

| $\eta_{phot}$ | $\eta_{therml}$ | $B_{STEP}(\zeta = 0.1)$ | $B_{STEP}(\zeta = 0.3)$ | $B_{STEP}(\zeta = 0.5)$ |
|---|---|---|---|---|
| 0.1 | 0.1 | 0.48 | 0.40 | 0.35 |
| 0.1 | 0.3 | 0.25 | 0.21 | 0.18 |
| 0.1 | 0.5 | 0.17 | 0.14 | 0.12 |
| 0.3 | 0.1 | 0.74 | 0.62 | 0.54 |
| 0.3 | 0.3 | 0.53 | 0.45 | 0.39 |
| 0.3 | 0.5 | 0.42 | 0.36 | 0.31 |
| 0.5 | 0.1 | 0.83 | 0.70 | 0.61 |
| 0.5 | 0.3 | 0.70 | 0.59 | 0.51 |
| 0.5 | 0.5 | 0.61 | 0.51 | 0.44 |

A STEP Process for the Efficient Solar Splitting, Activation and Utilization of $CO_2$.

The global community is increasingly aware of the climate consequences of elevated greenhouse gases. A solution to rising carbon dioxide levels is needed, yet carbon dioxide is a highly stable, noncombustible molecule, and its thermodynamic stability makes its activation energy demanding and challenging. The most challenging step in converting $CO_2$ to useful products and fuels is the initial activation of $CO_2$, for which energy is required. It is obvious that using traditional fossil fuels as the energy source would completely defeat the goal of mitigating greenhouse gases. A preferred route is to recycle and reuse the $CO_2$ and provide a useful carbon resource. We limit the non-unit activity examples of $CO_2$ STEP mitigation in eq. 5 to the case when CO and $O_2$ are present are as electrolysis products, which yields $a_{O_2}=0.5a_{CO}$, and upon substitution into eq. 12:

$$E_{STEP}(T,a)=E°_{STEP}(T)-(RT/2F) \cdot \ln(N);\ E°(25°\,C.)=1.333V;\ N=\sqrt{2}a_{CO_2}/(a_{CO})^{3/2} \qquad (30)$$

Figure 6:
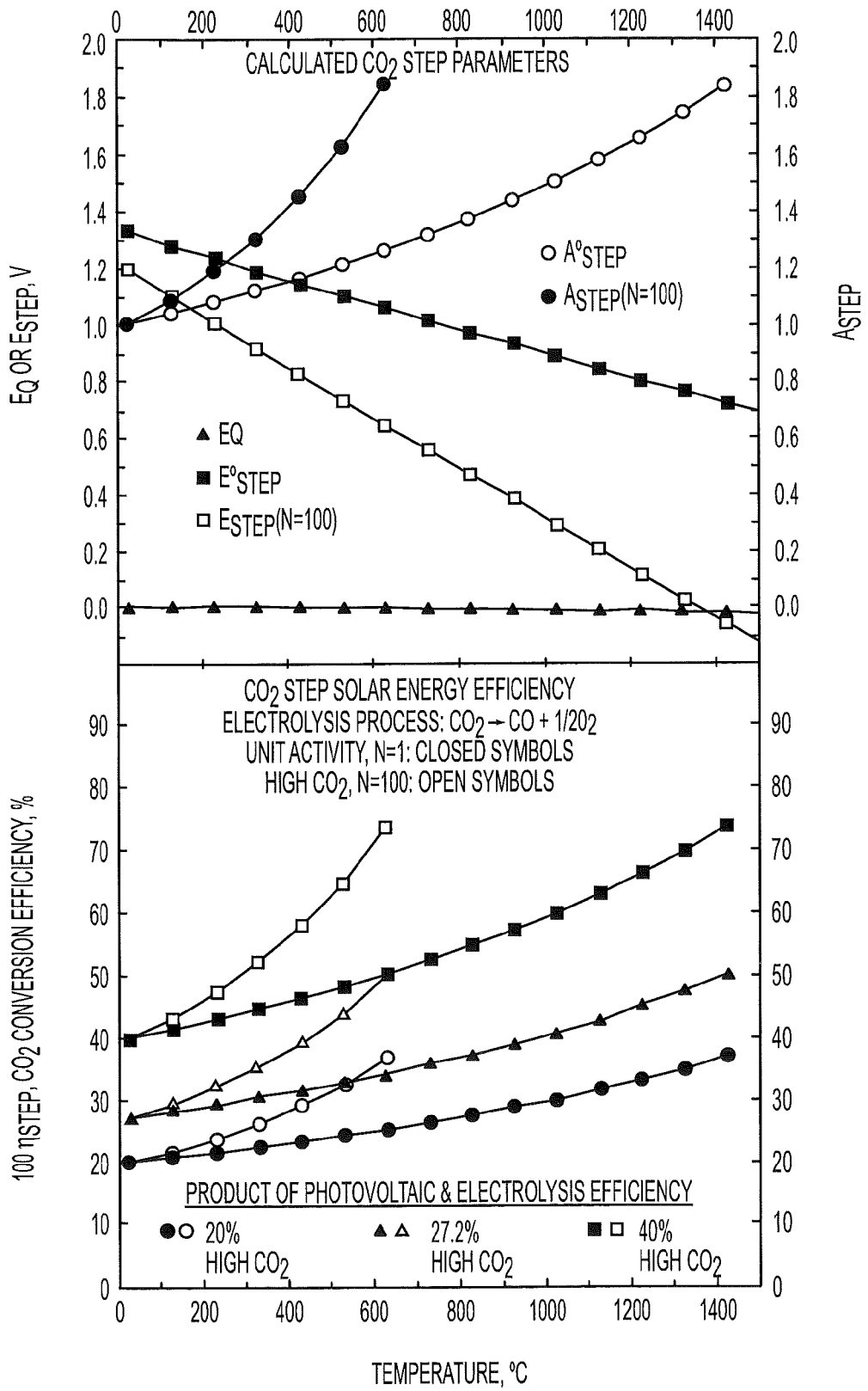
FIG. 6 shows calculated STEP parameters for the solar conversion of $CO_2$ and solar to chemical STEP conversion efficiencies calculated from eq. 14 for the conversion of $CO_2$ to CO and $O_2$.

FIG. 6 shows calculated STEP parameters for the solar conversion of $CO_2$ and solar to chemical STEP conversion efficiencies calculated from eq. 14 for the conversion of $CO_2$ to CO and $O_2$. In the case in which the product of the photovoltaic and electrolysis efficiency is 27.2% ($\eta_{PV} \cdot \eta_{electrolysis}=0.272$), the STEP conversion efficiency at unit activity is 35%, at the 650° C. temperature consistent with molten carbonate electrolysis, rising to 40% at the temperature consistent with solid oxide electrolysis (1000° C.). Non-unit activity calculations presented are for the case of $\sqrt{2}a_{CO_2}a_{CO}^{-3/2}=100$. A solar STEP conversion efficiency of 50% is seen at 650° C. when N=100 (the case of a cell with 1 bar of $CO_2$ and ~58 mbar CO). The example of $E_{STEP}(T,a\neq 1)$ in the top of FIG. 6 is derived when N=100, and results in a substantial drop in the energy to split $CO_2$ due to the discussed influence of RT/2F. Note at high temperature conditions in the figure, $E_{STEP}$<0 occurs, denoting the state in which the reactants are spontaneously formed (without an applied potential). This could lead to the direct thermochemical generation of products, but imposes substantial experimental challenges. To date, analogous direct water splitting attempts, are highly inefficient due to the twin challenges of high temperature material constraints and the difficulty in product separation to prevent back reaction upon cooling. This STEP process avoids this back reaction through the separation of products, which spontaneously occurs in the electrochemical, rather than chemical, generation of products at separate anode and cathode electrodes.

The differential heat required for $CO_2$ splitting, $E_Q$, and the STEP potential at unit activity, $E°_{STEP}$, are calculated and presented in the top of FIG. 6. $E_Q$ has also been calculated and is included. $E_Q$ is small (comprising tens of millivolts or less) over the entire temperature range. Hence from eq. 12, $E°_{STEP}$ does not differ significantly from the values presented for $E_T°$ for $CO_2$ in FIG. 4. $E_{CO_2split}(25°$ C.) yields $A_{STEP}(T)=1.333V/E°_{STEP}(T)$ with unit activity, and $A_{STEP}(T)=1.197V/E_{STEP}(T)$ for the N=100 case. Large resultant STEP factors are evident in the top of FIG. 6. This generates substantial values of solar to chemical energy conversion efficiency for the STEP $CO_2$ splitting to CO and $O_2$.

A STEP process operating in the $\eta_{PV}\eta_{electrolysis}$ range of 0.20 to 0.40 includes the range of contemporary 25 to 45% efficient concentrator photovoltaics, and electrolysis efficiency range of 80 to 90%. From these, the STEP $CO_2$ solar splitting efficiencies are derived from eq. 14, and are summarized in the lower portion of FIG. 6. The small values of $E_{STEP}(T)$ at higher T, generate large STEP factors, and result in high solar to chemical energy conversion efficiencies for the STEP splitting of $CO_2$ to CO and $O_2$. As one intermediate example from eq. 14, we take the case of an electrolysis efficiency of 80% and a 34% efficient photovoltaic ($\eta_{PV}\eta_{electrolysis}$=0.272). This will drive STEP solar $CO_2$ splitting at molten carbonate temperatures (650° C.) at a solar conversion efficiency of 35% in the unit activity case, and at 50% when N=100 (the case of a cell with 1 bar of $CO_2$ and 58 mbar CO).

STEP Electrolysis Components.

High temperature chemical (rather than electrochemical) syntheses, can be inefficient due to the recombination of products prior to extraction. This challenge is largely avoided in electrochemical syntheses in which products are generated at separate anode and cathode locations. The experimental high temperature advantage of the electrochemical generation of energetic molecules at decreased potential has been documented in molten hydroxide media at 200-600° C. and solid oxides approaching 1000° C. Appropriate electrocatalysts, and cell configurations need to be explored which will be specific to the efficient electrolysis of each of the STEP's energetic products. For example, in the molten hydroxide cell, cross-over anode/cathode recombination occurred in the molten hydroxide cell, which was prevented by introduction of a zirconia separator, however at the cost of increased overpotentials (the complete configuration electrolysis potential, including overpotential, remained considerably less that the room temperature electrolysis potential). The cross-over recombination effect has been largely avoided in molten temperature carbonate cells operating at 600-750° C. (albeit operating in fuel cell, rather than electrolysis mode, as well as in solid oxide cells operating in the electrolysis mode at 750-850° C.

STEP Optical Components

Optical components which are consistent with the STEP generation of energetic molecules are available from a variety of mature (commercially produced), cost effective technologies. Hot mirrors are optically efficient beam splitters, which use multi-layer dielectric coatings to split incident radiation into separate visible and infrared components. For example an off the shelf 45° C. angle of incidence, 750 nm, beam splitter is an inexpensive hot mirror which has transmission efficiency of 90-95%; custom beam splitters can be made at higher transmission efficiency, and tuned to other cutoff wavelengths, using specific dielectrics. A large fraction of incident sunlight is available to heat the STEP electrolysis chamber. For example, consider the case of a 1.4 eV band-cuttoff system operating at 33.3% solar to electric efficiency (such as a gedanken, efficient GaAs bandgap limited photovoltaic). In this case, one third of all AM1.5 insolation occurs at an energy below 1.4 eV, while 50% of the remaining super-bandgap insolation is available as heat. In total ⅔ of the total insolation is available as thermal energy to provide heat for the electrolysis chamber. Hence as little as 67% (for the gedanken case), or as much as 90% (for an inefficient 10% PV) of insolation may be available for thermal capture in the STEP process. While, this is less than that available for pure solar thermal processes, it does represent the majority of available insolation. Furthermore, STEP heating requirements and $E_{heat}$ will further decrease when hot source reactants are available, such as $CO_2$ in smoke exhaust.

At least three different optical solar concentration technologies are in the midst of large scale deployment. All are presently used for solar/electrical generation. The STEP process can use similar concentration technologies, albeit toward generation of an alternative product (energetic molecules rather than electricity). The deployed optical technologies consist of power towers, and parabolic or fresnel concentrators. Even an array of simple flat mirrors reflecting to a central tower, such as demonstrated by Brightsource can achieve temperatures of 550° C., while better mirrors and secondary optics can achieve temperatures over 1000° C. Several other variations of this power tower concept are under commercial development. Individual parabolic heliostats are being used in the solar thermal-mechanical engine generation of electricity. Such modular commercial parabolic concentrators achieve temperatures of 800° C. Short focal length, plastic fresnel generating optical concentrations of 500-1000 suns have been deployed for concentrator photovoltaics.

In this study, the STEP process is derived for the general formation of energetically rich chemicals. The process distinguishes radiation that is intrinsically energy sufficient (super-bandgap), or insufficient (sub-bandgap), to drive photovoltaic charge transfer, and applies all excess energy to heat and decrease the energy of an electrolysis reaction. Specifically, the STEP removal of $CO_2$ can occur at high solar efficiency at temperatures consistent with available molten carbonate fuel cells, available optical concentrators and available photovoltaics; for example in 650° C. molten carbonate electrolysis configurations, sunlight will drive $CO_2$ removal at 50% solar conversion efficiency in a cell with ~58 mbar CO and 1 bar of $CO_2$.

In addition to the removal of $CO_2$, the STEP process is shown to be consistent with the efficient solar generation of a variety of metals, as well as chlorine, in place of conventional industrial processes. In total, these processes are responsible for the majority of anthropogenic CO₂ release, and their replacement by STEP processes will end the root cause of anthropogenic global warming. The STEP process occurs at solar energy conversion efficiency greater than attainable by photovoltaics alone. This study provides a path for a transition beyond the fossil fuel, electrical or hydrogen economy, to a renewable chemical economy based on the direct formulation of the materials needed by society.

The above discussed methods are further explained in the following non-limiting examples.

EXAMPLES

Experiments were carried out to demonstrate the process for solar electrosynthesis of energetic molecules, specifically the Solar Thermal Electrochemical Photo process of carbon dioxide capture and conversion to solid carbon and to carbon monoxide. It was shown that the required carbon capture energy is low and can be minimized in lithium carbonate compared to alternate molten carbonates such as potassium carbonate and sodium carbonate. We observed that solid carbon is the energetically preferred carbon capture product at temperatures approaching up to 900° C., and the monoxide product becomes energetically preferred at temperatures over 900° C. Without being bound to any theory, it is observed that the experimental carbon capture correlates with:

$$Li_2CO_3(molten) \rightarrow C(solid) + Li_2O(dissolved) + O_2(gas) \quad (31A)$$

$$Li_2CO_3(molten) \rightarrow CO(gas) + Li_2O(dissolved) + \tfrac{1}{2}O_2(gas) \quad (31B)$$

When CO₂ is bubbled in, a rapid complete reaction back to the original lithium carbonate occurs:

$$Li_2O(dissolved) + CO_2(gas) \rightarrow Li_2CO_3(molten) \quad (32)$$

Reaction 32 is strongly favored (exothermic) and the rapid reaction back to the original lithium carbonate occurred while CO₂ was bubbled into the molten lithium carbonate containing lithium oxide.

The carbon capture reaction in molten carbonate, combines equations 31 and 32:

$$CO_2(gas) \rightarrow C(solid) + O_2(gas) \leq T \leq 900° C.;$$
$$CO_2(gas) \rightarrow CO(gas) + \tfrac{1}{2}O_2(gas) \geq 950° C. \quad (33)$$

Figure 7:
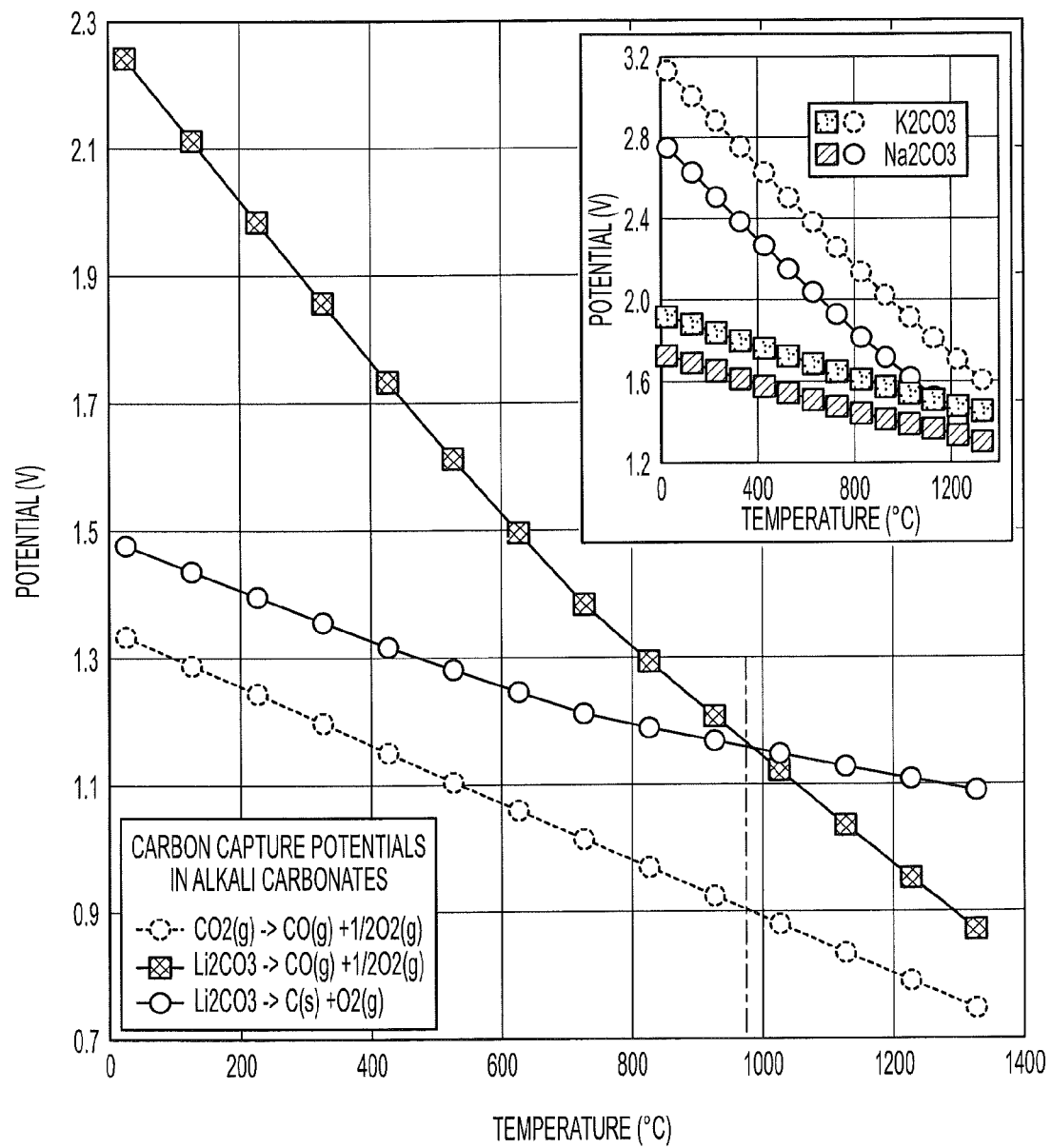
FIG. 7 shows the calculated electrolysis energy for carbon capture and conversion in $Li_2CO_3$ (main figure), $Na_2CO_3$ (figure inset), or $K_2CO_3$ (figure inset).

Electrochemical potentials for electrolysis of carbon dioxide in molten lithium, sodium and potassium carbonates were calculated from fundamental thermo dynamic data and are summarized in FIG. 7. As seen in the figure, lithium carbonate electrolytes are thermodynamically preferred, requiring less energy to generate the same carbon products than sodium or potassium carbonate electrolytes. In molten Li₂CO₃, increasing from 900 to 1000° C., the thermodynamically preferred (low energy) product switches from solid carbon to CO (gas). Electrolysis potentials are calculated from the thermodynamic free energies components of the reactants and products as E=−ΔG(reaction)/nF, where n=4 or 2 for the respective conversion to the solid carbon or carbon monoxide products. To the left of the vertical near 950° C., solid carbon is the thermodynamically preferred (lower energy) product. To the right of the vertical line, CO is preferred.

The experimental electrolysis potentials of carbon capture in molten carbonates can occur at a lower energy than the unit activity potentials calculated in FIG. 7. A constant influx of carbon dioxide into the cell maintains a low concentration of Li₂O, in accord with reaction 32. The resultant high ratio, Θ, of the carbonate reactant to the oxide product in the electrolysis chamber, decreases the cell potentials in accord with the Nernst concentration variation of the potential as:

$$E_{CO_2/X}(T) = E°_{CO_2/X}(T) - 0.0592V * T*/(n*298K) * \log(\Theta);$$

$$n=4 \text{ or } 2, \text{ when } X = C_{solid} \text{ or } CO \quad (34)$$

For example in accord with equation 34, the expected cell potential at 950° C. for the reduction to the CO product is $E_{CO_2/CO}$=1.17 V−(0.243V*/2)*4=0.68 V at a high Θ=10,000 carbonate/oxide ratio in the electrolysis chamber.

Figure 8:
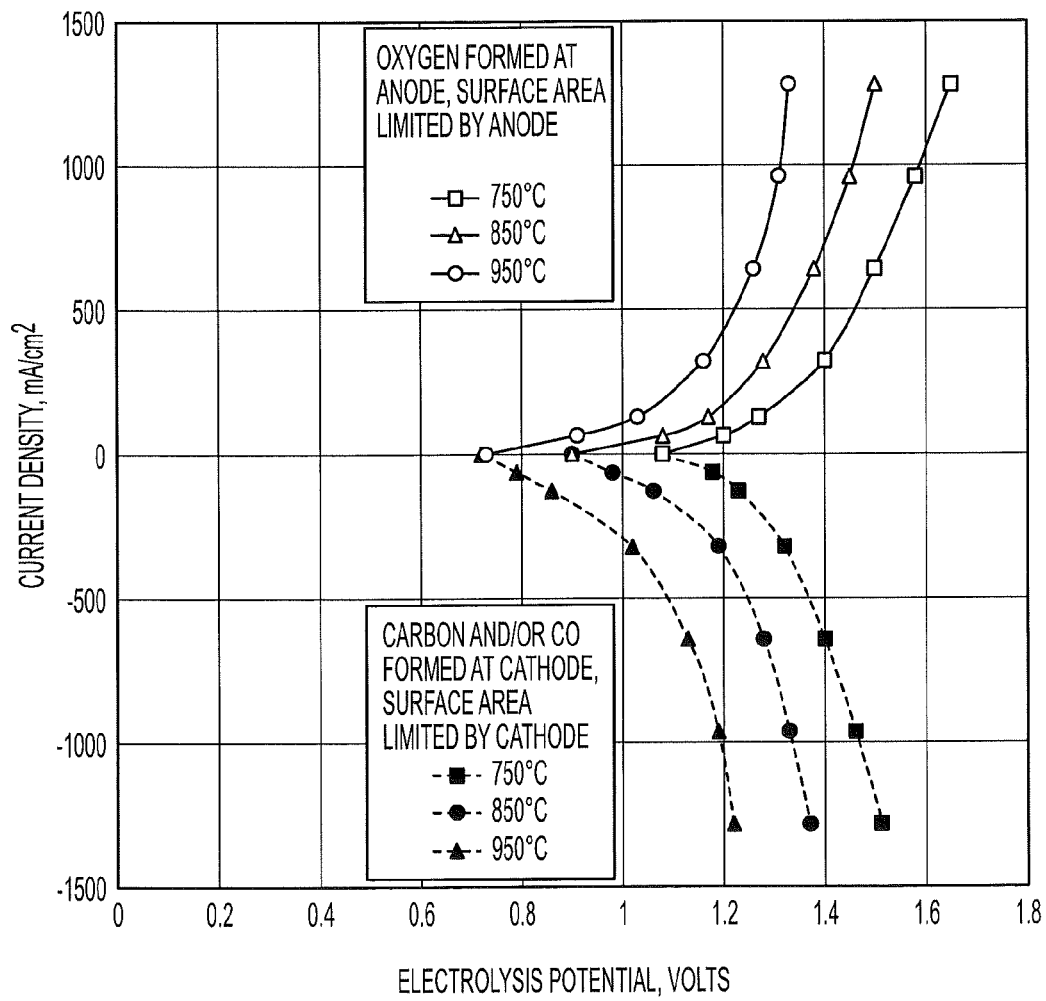
FIG. 8 shows the measured electrolysis potential at a platinum electrode for a range of stable anodic and cathodic current densitites in molten $Li_2CO_3$.

The observed experimental electrolysis potentials for carbon capture of carbon dioxide in molten lithium carbonate electrolyte are presented in FIG. 8. At 750° C. carbon dioxide was captured as solid carbon by reduction at the cathode, resulting in deposition of the solid carbon product on the cathode. At 750° C. in molten carbonate, carbon dioxide fed into the electrolysis chamber was converted to solid carbon in a single step. In FIG. 8 the electrolysis potential at a platinum electrode for a range of stable anodic and cathodic current densitites in molten Li₂O₃ is shown. The anode measurements restricted the majority of overpotential effects to an 0.078 square centimeters (cm²) anode by using an oversized cathode (12.5 cm²); reverse size electrodes were utilized in the measurements which restrict the majority of overpotential effects to the cathode. The carbon formed was quantitatively in accord with equation 31, as determined by (i) mass (the carbon was washed in a sonicator, dried at 90° C. and weighed), (ii) ignition (furnace combustion at 950° C.) and (iii) volumetric analysis in which KIO₃ was added to the carbon, converted to CO₂ and I₂ in hot phosphoric acid (C+4KIO₃+4H₃PO₄->5CO₂+2I₂+2H₂O+4 KH₂PO₄), the liberated I₂ was dissolved in 0.05 M KI and titrated with thiosulfate using a starch indicator. The gas phase disproportionation between CO₂+C to 2CO has been studied (the Boudouard reaction) and favors the CO product at high temperature. In molten lithium carbonate we also observed this transition to the carbon monoxide product with increasing temperature. Specifically, at 850° in molten Li₂CO₃, the product is a 2:1 ratio of % solid carbon to gas phase CO, at 900° C., the ratio is 0.5:1, and at 950° C. the gas is the sole product. Hence, in accord with FIG. 7, switching between either product is temperature programmable.

The first series of experiments avoided materials that may be corroded to simplify interpretation of the observed results. Specifically, platinum electrodes were used and carbon dioxide flowed into a molten lithium carbonate contained in a (non-reactive) high purity alumina crucible. The measured potentials were comparable to the activity corrected electrolysis potentials of eq. 34, approached the gas phase electrolysis potentials in FIG. 7, and presented the expected decrease in potential with increase of temperature. As seen in FIG. 8, electrolysis anodic overpotentials in Li₂CO₃ electrolysis are comparable but larger than cathodic overpotentials, and current densities over 1 A cm⁻² can be sustained. We replaced platinum with nickel, nickel alloys (inconel and monel), titanium and carbon and each are effective carbon capture cathode materials. Solid carbon deposited on each of these cathodes at similar overpotential in 750° C. molten Li₂CO₃. For the anode, both platinum and nickel were effective anode materials, while titanium corrodes under anodic bias in molten Li₂CO₃. A nickel anode initially oxidizes at a potential shifted +0.5 V anodically (compared to oxygen) during the passage of approximately 10 mC cm⁻² following which the potentials exhibited a platinum-like stability and value variation with temperature and current density. This thin nickel oxide coating was surprisingly stable without mass or visible change after several hundred hours of operation at 0.1 A cm$^{-2}$ currents in a 750° C. $Li_2CO_3$ electrolysis cell. Inconel and monel nickel alloys were also effective, however at 950° C. the monel alloy anode quickly corroded, presumably due to oxidation of the copper component of the alloy. In lieu of alumina, a cell body of monel was effective in air at temperatures up to 750° C., beyond which it corroded. A cell body of pure nickel was stable up to 900° C. At 950° C. the air oxidation of nickel electrodes exposed above the electrolyte was avoided through a spot weld platinum wire leading to the Ni electrode immersed in the molten carbonate.

The complete, rapid reaction back to the original lithium carbonate was observed when either low or high concentrations of $CO_2$ were bubbled into the molten lithium carbonate containing lithium oxide. Hence, the system appears effective for carbon capture of both dilute and high concentrations of carbon dioxide in the air, and bypasses the need of alternative approaches, which require a pre-concentration step for the capture of $CO_2$. Atmospheric or smoke-stack gas phase levels of carbon dioxide concentrations were bubbled in and directly converted to either carbon monoxide or solid carbon. The rapid reaction eq. 32 is evident with 2-electrode cyclic voltammetry, CV, (5 mV/s sweep between platinum electrodes). In this experiment, the molten $Li_2CO_3$ was specifically electrolyzed in the absence of added $CO_2$. This allowed the $Li_2O$ reaction product to increase within the $Li_2CO_3$. Following this, while $CO_2$ was added, an intermediate was evident as an additional CV reduction peak (at 0.4 V), which disappeared within seconds upon introduction of sufficient $CO_2$ to react with the $Li_2O$ and reform $Li_2CO_3$. This was in addition to the sole carbonate reduction peak at ~1V which occurs prior to, during and after, this brief reaction. An alkali oxide ($Li_2O$) is presented as the reaction product in equation 33. This is the predominant stable oxide species at molten carbonate temperatures (LiO peroxide decomposes at this temperature), but does not preclude the possible peroxide (LiO) or superoxide ($Li_2O_2$) transient product species contribution to the charge transfer process; either species would also react with added $CO_2$ to reform the $Li_2CO_3$. Unlike other fuel cells, carbonate fuel cells are resistant to poisoning effects and are effective with a wide range of fuels, and this appears to be the same for the case in the reverse mode (to capture carbon, rather than to generate electricity). Molten $Li_2CO_3$ remains transparent and sustains stable electrolysis currents after extended (hours/days) of carbon capture over a wide range of electrolysis current densities and temperatures.

Figure 9:
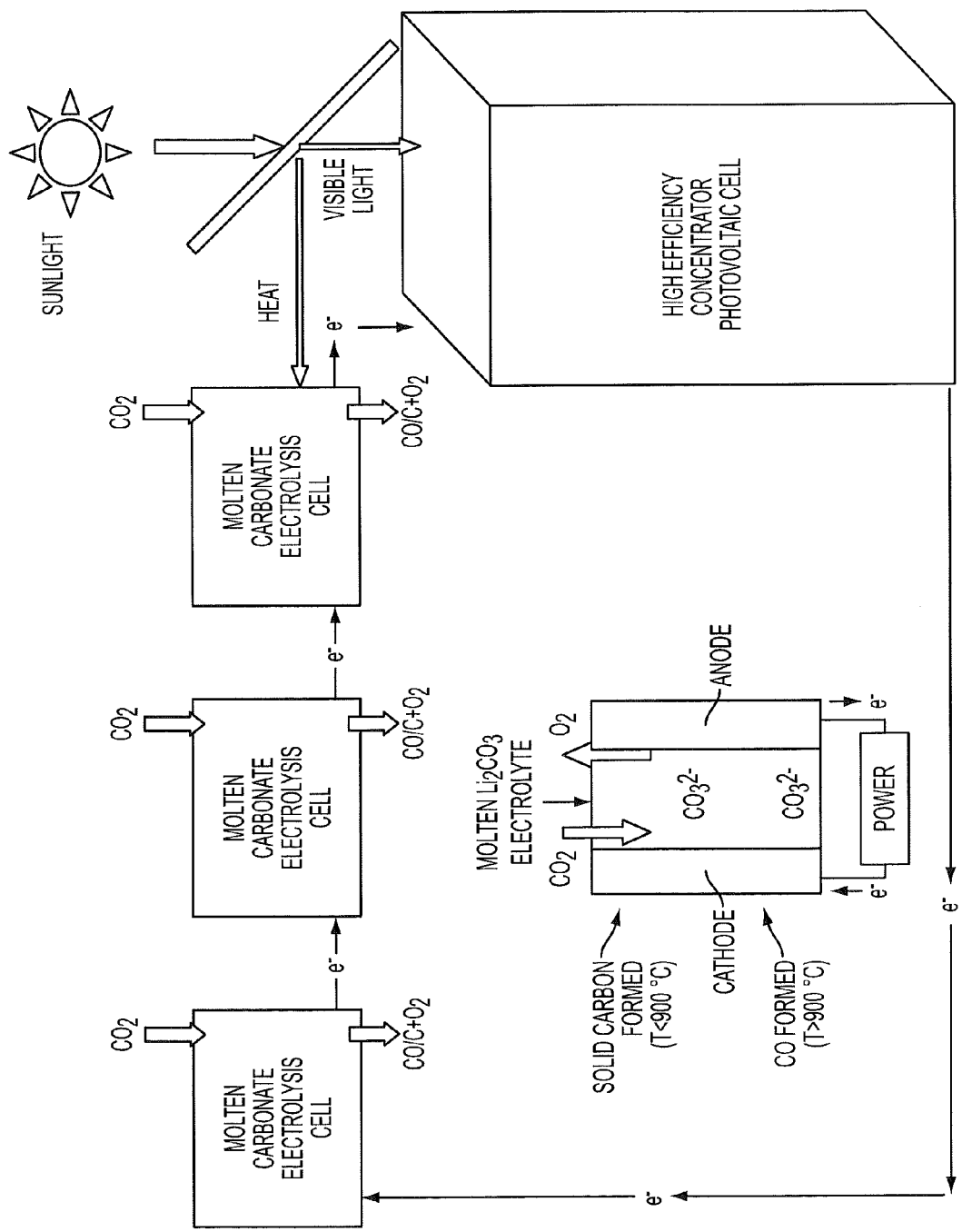
FIG. 9 shows the STEP carbon capture, in which three molten carbonate electrolysis in series are driven by a concentrator photovoltaic.
Figure 10:
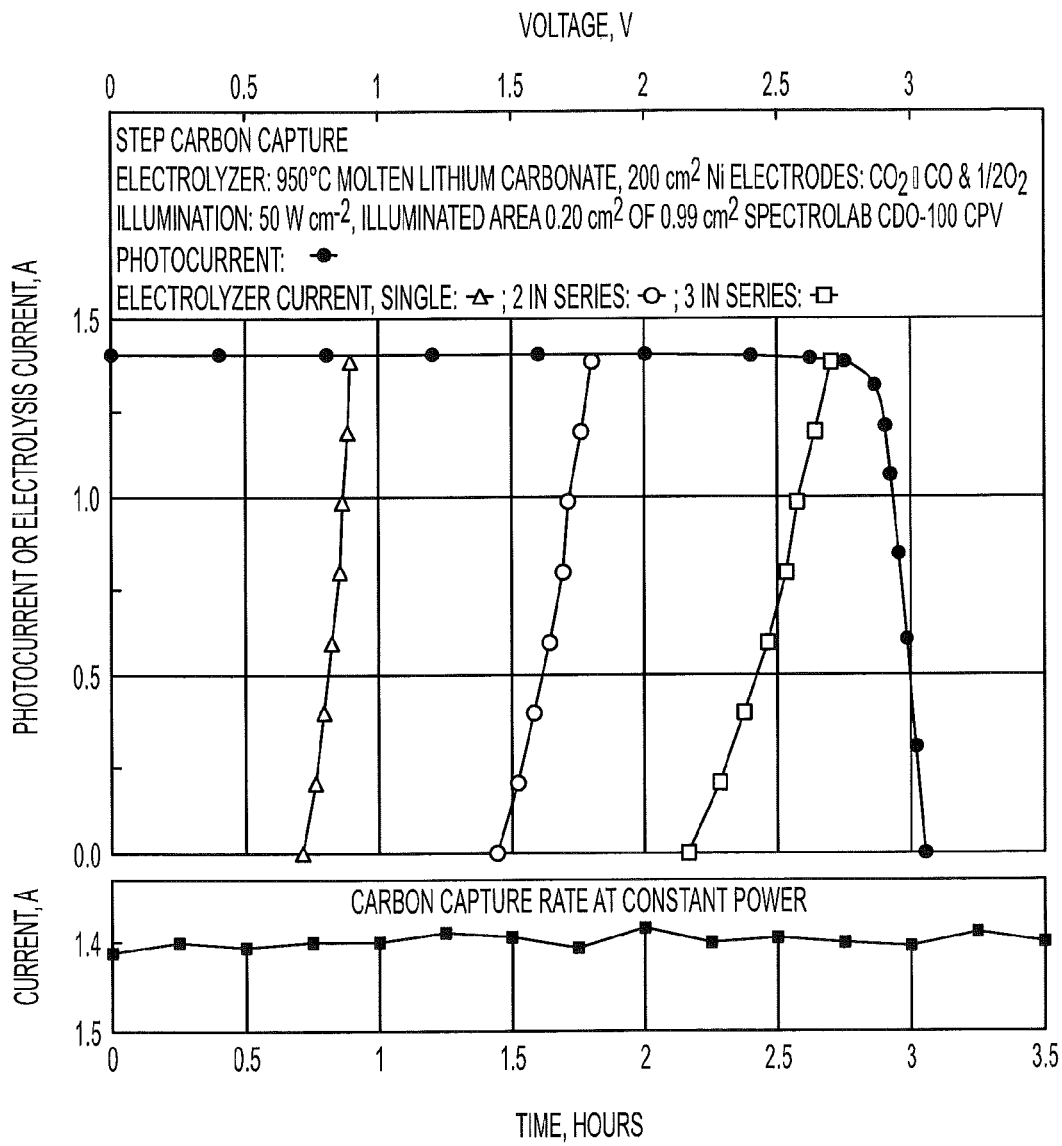
FIG. 10 top: shows the STEP photocurrent or the STEP electrolysis current versus voltage; electrolysis current for one, two or three carbon capture electrolysis cells.

Components for STEP for $CO_2$ capture and conversion to solid carbon are represented in FIG. 9. Specifically, a Spectrolab CCA-100-C1MJ concentrator solar cell (also referred to as a concentrator photovoltaic cell or CPV) was used to generate 2.7 V at maximum power point, with solar to electrical energy efficiencies of 35% under 50 suns illumination, and 3% under 500 suns illumination. At maximum power, the 0.99 cm$^2$ cell generated 1.3 A at 50 suns, and when masked to 0.2 cm$^2$ area generated 1.4 A at 500 suns. The 2.7 V was used to drive two molten electrolysis cells in series at 750° C. (not shown in FIG. 9) and three in series at 950° C. (the latter is pictured in FIG. 9). Electrolysis electrode surface areas were chosen to match the solar cell generated power. The electrolysis chamber consisted of a pure nickel body bored with a 4.5 cm diameter well, 9 cm deep, and filled to 7 cm with $Li_2CO_3$. The nickel body inner area (115 cm$^2$) exposed to the $Li_2CO_3$ serves as the anode and is extended by electrical coupling an inner cylinder formed from pure nickel sheet (5.7 cm×15 cm=85 cm$^2$, McMaster pure Ni 200 foil). The cathode is a cylindrical nickel sheet (McMaster 9707K35) (6.5 cm×15×2 sides cm=200 cm$^2$) sandwiched between the inner and outer components of the anode. At 750° C., these size electrodes generate stable 1.35V carbon formation at 1.3 A, and at 950° C., generate stable 0.9 V carbon monoxide formation at 1.4 A. The power voltage curves for three series connected 950° C. electrolysis cells driven at 2.7 V 1.4 A by the concentrator solar cell is shown in FIG. 10.

The reactant $CO_2$ can be heated in a three tier process: (1) preheating consists of $CO_2$ through a heat exchange fixed to the back of the concentrator solar cell or preheating to simulate $CO_2$ extracted from a hot smoke stack, (2) secondary heating consists of passing this $CO_2$ through a heat exchange with the outgoing gas phase carbon capture products, (3) tertiary heat is applied through concentrated, split solar thermal energy. We have driven the STEP process with two different solar simulator light sources. The first was a sodium-free xenon 1 kW source. This provides a good match to the visible sun spectrum, but is enriched, compared to insolation, in the thermal spectra different. The second was a 1.5 kW metal halide source which is a good overall match to the visible spectrum, but is less blackbody-like (less smooth) and contains extra individual peak emissions in the spectral output.

The available separated solar thermal component of the spectrum provides a portion of the heat for the STEP carbon capture process. The efficiency of thermal energy transfer will limit use of this available heat. The CPV does not need, nor function with, sunlight of energy less than that of the 0.67 eV bandgap of the multi-junction Ge bottom layer. From our previous calculations, this thermal energy comprises 10% of AM1.5 insolation, and under 0.5 MW m$^{-2}$ of incident sunlight (500 suns illumination), yields approximately 50 kW m$^{-2}$, which may be split off as thermal energy towards heating the electrolysis cell without decreasing the CPV electronic power. Within the electrolysis cell heating occurs from the resistive overpotential and cooling from the enthalpy of formation of the products. In addition, the CPV, while efficient, utilizes less than half of the super-bandgap (>0.67 eV) sunlight, and a portion of this (>approximately 250 kW m$^{-2}$) available energy is extracted through heat exchange at the backside of the CPV.

The STEP solar efficiency, $\eta_{STEP}$, is constrained by both photovoltaic and electrolysis conversion efficiencies, $\eta_{PV}$ and $\eta_{electrolysis}$(1). In an operational STEP system, passage of electrolysis current requires an additional, combined (anodic and cathodic) overpotential above the thermodynamic potential. However, mobility and kinetics improve at higher temperature to decrease overpotential. The generated CO contains an increase in oxidation potential compared to carbon dioxide at room temperature (E°(25° C.)=1.33 V for $CO_2 \rightarrow CO + \frac{1}{2}O_2$ in FIG. 1), of 0.43 V compared to the 0.90 V used to generate the CO.

The product carbon may be stored or used, and the product carbon monoxide can be used to form a myriad of industrially relevant products including conversion to syngas fuels with hydrogen (which is generated by STEP water splitting). CO with $H_2$ can be important reactants in implementing reactions to form a wide variety of organic compounds, such as alcohols, or the Fischer Tropsch generation of fuels, such as (16):

$$nCO+(2n+1)H_2 \rightarrow C_nH_{(2n+2)}+nH_2O \quad (35)$$

All ranges disclosed herein are inclusive and combinable (e.g., ranges of "up to about 25 wt %, or, more specifically about 5 wt % to about 20 wt %" is inclusive of the endpoints and all intermediate values of the ranges of "about 5 wt % to about 25 wt %," etc.). The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A process for the production of a product compound comprising:
   a. splitting captured solar spectrum energy into a solar thermal heating component and a solar electrical photovoltaic component;
   b. generating electricity from the solar electrical photovoltaic component;
   c. heating an electrolyzable compound with the solar thermal heating component to form a molten electrolyzable compound; and
   d. subjecting the molten electrolyzable compound to electrolysis with the solar generated electricity to generate the product compound.

2. The process of claim 1, wherein the electrolyzable compound comprises carbon dioxide.

3. The process of claim 1, wherein the electrolyzable compound comprises a carbonate salt.

4. The process of claim 1, wherein the electrolyzable compound is heated to a temperature of 200 to 650 degrees Celsius.

5. The process of claim 1, wherein the electrolyzable compound is heated to a temperature of 650 to 1500 degrees Celsius.

6. The process of claim 1, wherein the electrolysis is defined as $$CO_2(g) \rightarrow CO(g) + \tfrac{1}{2}O_2(g).$$

7. The process of claim 1, wherein the electrolysis is defined as $$M_xCl_y \rightarrow y/2 Cl_2 + xM$$

wherein M in $M_xCl_y$ is a metal cation, an organic cation, a nitrogen containing cation or a phosphorous containing cation.

8. The process of claim 1, wherein the energetically rich electrolytic product comprises chlorine gas.

9. The process of claim 1, wherein the electrolysis comprises $$CO_2 \rightarrow C + O_2.$$

10. The process of claim 1, wherein the electrolysis comprises $$M_2CO_3 \rightarrow CO + M_2O + \tfrac{1}{2}O_2$$

wherein M is a metal cation, an organic cation, a nitrogen containing cation or a phosphorous containing cation.

11. The process of claim 10, wherein M is lithium.

12. The process of claim 1, wherein the electrolysis comprises $$M_2CO_3 \rightarrow C + M_2O + O_2$$

wherein M is a metal cation, an organic cation, a nitrogen containing cation or a phosphorous containing cation.

13. The process of claim 1, wherein the product compound includes carbon compounds with energy greater than carbon dioxide.

14. The process of claim 1, wherein the product compound comprises carbon monoxide, and the process further comprises combining the carbon monoxide with hydrogen to form alcohols and molecules of the form $C_nH_{(2n+2)}$, where n>0.

15. The process of claim 1, wherein the electrolysis comprises $$Fe_2O_3 \rightarrow 2Fe + 3/2 O_2.$$

16. The process of claim 1, wherein the energetically rich electrolytic comprises a metal.

17. The process of claim 1, further comprising the step of heating the electrolyzable compound with externally supplied thermal energy, in addition to the heating of step (c), wherein the heating steps provide the electrolyzable compound in a molten state.

18. A process for the production of a product compound, comprising:
   a. splitting captured solar spectrum energy into a solar thermal heating component and a solar electrical photovoltaic component;
   b. generating electricity from the solar electrical photovoltaic component;
   c. capturing heat from the step of generating electricity;
   d. combining the solar thermal heating component from the splitting step, with the captured heat from the step of generating electricity;
   e. heating one or more electrolyzable compounds to provide the electrolyzable compounds in a molten state;
   f. subjecting said molten electrolyzable compounds to electrolysis; and
   g. obtaining the electrolysis products.

19. The process of claim 18, wherein the electrolyzable compound comprises carbon dioxide.

20. The process of claim 18, wherein the electrolyzable compound comprises a carbonate salt.

21. The process of claim 18, wherein the one or more electrolyzable compounds is heated to a temperature of 200 to 650 degrees Celsius in step e.

22. The process of claim 18, wherein the one or more electrolyzable compounds is heated to a temperature of 650 to 1500 degrees Celsius in step e.

23. The process of claim 18, wherein the electrolysis is defined as $$CO_2(g) \rightarrow CO(g) + \tfrac{1}{2}O_2(g).$$

24. The process of claim 18, wherein the electrolysis is defined as $$M_xCl_y \rightarrow y/2 Cl_2 + xM$$

wherein M in $M_xCl_y$ is a metal cation, an organic cation, a nitrogen containing cation or a phosphorous containing cation.

25. The process of claim 18, wherein the electrolysis comprises $$CO_2 \rightarrow C+O_2.$$

26. The process of claim 18, wherein the electrolysis comprises $$M_2CO_3 \rightarrow CO+M_2O+\tfrac{1}{2}O_2$$

wherein M is a metal cation, an organic cation, a nitrogen containing cation or a phosphorous containing cation.

27. The process of claim 26, wherein M is lithium.

28. The process claim 18, wherein the electrolysis comprises $$M_2CO_3 \rightarrow C+M_2O+O_2$$

wherein M is a metal cation, an organic cation, a nitrogen containing cation or a phosphorous containing cation.

29. The process of claim 18, wherein the electrolysis product comprises carbon monoxide, and the process further comprises combining the carbon monoxide with hydrogen to form alcohols, molecules of the form $C_nH_{(2n+2)}$, where n>0, or both.

30. The process of claim 18, wherein the electrolysis comprises $$Fe_2O_3 \rightarrow 2Fe+3/2O_2.$$

31. A process for the production of a product compound, comprising:

a. splitting captured solar spectrum energy into a solar thermal heating component and a solar electrical photovoltaic component;
b. generating electricity from the solar electrical photovoltaic component;
c. capturing heat from the step of generating electricity;
d. heating with the solar thermal heating component and with the heat captured in step (c) one or more electrolyzable compounds to provide the electrolyzable compounds in a molten state;
e. subjecting the molten electrolyzable compounds to electrolysis to generate a product compound.

32. The process of claim 31, wherein the externally supplied thermal energy comprises solar energy.

33. The process of claim 31, wherein the externally supplied thermal energy comprises thermal energy from exhaust gasses.

34. The process of claim 31, wherein the externally supplied thermal energy comprises geothermal energy.

35. The process of claim 31, wherein the externally supplied thermal energy comprises thermal energy from nuclear energy.

36. The process of claim 31, wherein the externally supplied thermal energy is recovered from the production of the product compound.

\* \* \* \* \*